US012505633B2

(12) United States Patent
Choi et al.

(10) Patent No.: US 12,505,633 B2
(45) Date of Patent: Dec. 23, 2025

(54) SYSTEMS AND METHODS OF GUIDED INSTRUCTIONS OR SUPPORT USING A VIRTUAL OBJECT

(71) Applicant: Apple Inc., Cupertino, CA (US)

(72) Inventors: Joshua Choi, Sunnyvale, CA (US); Omar R. Khan, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 18/156,342

(22) Filed: Jan. 18, 2023

(65) Prior Publication Data

US 2023/0245410 A1    Aug. 3, 2023

Related U.S. Application Data

(60) Provisional application No. 63/304,458, filed on Jan. 28, 2022.

(51) Int. Cl.
*G06T 19/20* (2011.01)
*G06F 3/01* (2006.01)
*G06T 13/20* (2011.01)

(52) U.S. Cl.
CPC .............. *G06T 19/20* (2013.01); *G06F 3/017* (2013.01); *G06T 13/20* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 11,049,176 B1* | 6/2021 | Drynan | ............... | G06K 7/1095 |
| 11,200,742 B1* | 12/2021 | Post | ..................... | G06T 19/003 |
| 12,142,039 B1* | 11/2024 | Little | ................. | G02B 27/0093 |
| 2009/0285483 A1* | 11/2009 | Guven | ................. | G06Q 30/016 |
| | | | | 345/473 |
| 2013/0293468 A1* | 11/2013 | Perez | ..................... | G06F 3/033 |
| | | | | 345/158 |
| 2014/0184818 A1* | 7/2014 | Argue | .................... | H04N 23/00 |
| | | | | 348/207.1 |
| 2016/0155133 A1* | 6/2016 | Knafou | .............. | G06Q 30/0185 |
| | | | | 705/318 |

(Continued)

OTHER PUBLICATIONS

ARmedia Augmented Reality 3D tracker (I-Mechanic), Available online at: < https://www.youtube.com/watch?v=EUmNbNa3RYY &t=69s>, [Retrieved Apr. 19, 2023], May 23, 2013, 1 page.

(Continued)

*Primary Examiner* — Anh-Tuan V Nguyen
(74) *Attorney, Agent, or Firm* — Kubota & Basol LLP

(57) ABSTRACT

Disclosed herein is a method for providing guided instructions or support using a virtual object. The method comprises at a first computing device in communication with one or more input devices and a second computing device, capturing, using the one or more input devices, one or more images, determining an identity of an object using the one or more images, and transmitting the identity of the object to the second computing device. The method further comprises receiving from the second computing device an indication of a first input received at the second computing device and presenting a first view of the object comprising a first annotation that corresponds to the first input received at the second computing device.

24 Claims, 15 Drawing Sheets

(56) References Cited

U.S. PATENT DOCUMENTS

| | | | | |
|---|---|---|---|---|
| 2017/0360412 | A1* | 12/2017 | Rothberg | A61B 8/5207 |
| 2018/0159979 | A1* | 6/2018 | Amir | H04M 3/5183 |
| 2018/0324229 | A1* | 11/2018 | Ross | G06F 3/1423 |
| 2019/0244425 | A1* | 8/2019 | Koohmarey | G06V 20/20 |
| 2020/0035122 | A1* | 1/2020 | Abbott | G06T 19/20 |
| 2020/0117336 | A1* | 4/2020 | Mani | F25B 49/005 |
| 2020/0372715 | A1* | 11/2020 | Sawhney | G06T 7/75 |
| 2020/0409452 | A1* | 12/2020 | Nguyen | G06T 19/20 |
| 2020/0413006 | A1* | 12/2020 | Cheng | G11B 27/031 |
| 2021/0005022 | A1* | 1/2021 | Oser | G06Q 30/0281 |
| 2021/0134065 | A1* | 5/2021 | Ramani | G06F 3/0346 |
| 2021/0174371 | A1* | 6/2021 | Yoffe | G06V 20/20 |
| 2021/0217077 | A1* | 7/2021 | Drynan | G06K 7/1095 |
| 2022/0012947 | A1* | 1/2022 | Xie | G06T 19/006 |

OTHER PUBLICATIONS

Augmented Reality Turns Drivers into a Car Mechanic, Available online at: <https://www.bbc.com/news/av/technology-26134338>, Feb. 12, 2014, 1 page.

Bosch Augmented Reality for the Automotive Workshop, Available online at: <https://www.youtube.com/watch?v=gefW8EC-ZCc>, [Retrieved Apr. 19, 2023], Oct. 18, 2017, 1 page.

Bringing Automotive Repair Methods to Life—WorxAR, Available online at: <https://www.youtube.com/watch?v=4jwSkwNL1yM>, [Retrieved Apr. 19, 2023], May 7, 2019, 1 page.

Porsche Techs Use Augmented Reality Glasses to Repair Cars, Available online at: <https://www.youtube.com/watch?v=NSfzsw4eCXI>, [Retrieved Apr. 19, 2023], May 30, 2018, 1 page.

Repair Faster and Better with Augmented Reality, Available online at: <https://www.youtube.com/watch?v=nvr26gKluSQ>, [Retrieved Apr. 19, 2023], Jun. 30, 2014, 1 page.

Polap et al., "Obstacle Detection as a Safety Alert in Augmented Reality Models by the Use of Deep Learning Techniques", Sensors, vol. 17, No. 2803, Dec. 4, 2017, 16 pages.

Qeshmy et al., "Managing Human Errors: Augmented Reality Systems as a Tool in the Quality Journey", Procedia Manufacturing, vol. 28, 2019, pp. 24-30.

"Azure Digital Twins, Use IoT Spatial Intelligence to Create Models of Physical Environments." Web page, <https://azure.microsoft.com/en-us/services/digital-twins/#overview>, 10 pages, retrieved from Internet Archive Wayback Machine , <https://web.archive.org/web/20210929054216/https://azure.microsoft.com/en-us/services/digital-twins/#overview> on Aug. 8, 2024.

* cited by examiner

SYSTEMS AND METHODS OF GUIDED INSTRUCTIONS OR SUPPORT USING A VIRTUAL OBJECT

CROSS-REFERENCE TO RELATED APPLICATION

This application claims the benefit of U.S. Provisional Application No. 63/304,458, filed Jan. 28, 2022, the content of which is incorporated herein by reference in its entirety for all purposes.

FIELD OF THE DISCLOSURE

This relates generally to systems and methods for providing guided instructions or customer support using a virtual representation of a product and, in particular, presenting a view of the product including annotations.

BACKGROUND OF THE DISCLOSURE

Customer support represents a wide range of customer services to assist customers in the correct use of a product and includes assistance in planning, installation, training, troubleshooting, maintenance, upgrading, and disposal of a product. It is desirable to provide an improved customer support experience for a user.

SUMMARY OF THE DISCLOSURE

This relates generally to presenting a view of the product (also referred to herein as an object more generally) to a first user that incorporates annotations. In some examples, an annotation can be presented in accordance with (e.g., in response to) user input of a second user (e.g., a customer support person). In some examples, the annotations can be presented on the product (e.g., overlaid on the physical product or presented in proximity to the physical object and/or on a virtual representation of the physical product). For instance, in some examples, at a first computing device in communication with one or more input devices and a second computing device, one or more images can be captured using the one or more input devices. In some examples, an identity of a product can be determined using the one or more images. In some examples, the identity of the product can be transmitted to the second computing device. In some examples, an indication of a first input received at the second computing device can be received from the second computing device. In some examples, a first view of the product comprising a first annotation that corresponds to the first input received at the second computing device can be presented.

For instance, in some examples, at a first computing device in communication with one or more input devices and a second computing device, an identity of a product is received from the second computing device. In some examples, a first view of the product including a virtual representation of the product is presented, and an indication of a first input is detected using the one or more input devices, where the first input comprises an interaction with the virtual representation of the product. In some examples, an indication of the first input or a first annotation that corresponds to the first input is then transmitted to the second computing device.

This also relates to user input of a first user (e.g., a customer support person) providing user input to enable presentation of annotations for a product of a second user. In some examples, at a first computing device (a customer service representative device) in communication with one or more input devices and a second computing device (a customer/client/user device), an identity of a product can be received from the second computing device. A first view of the product including a virtual representation of the product can be presented to the first user using the first computing device. In some examples, an indication of a first input can be detected using the one or more input devices in communication with the first computing device. The first input can comprise an interaction with the virtual representation of the product (e.g., a gesture). In some examples, an indication of the first input or a first annotation that corresponds to the first input can be transmitted to the second computing device (e.g., for use in displaying the annotation to the second user of the second computing device).

DETAILED DESCRIPTION

Figure 1:
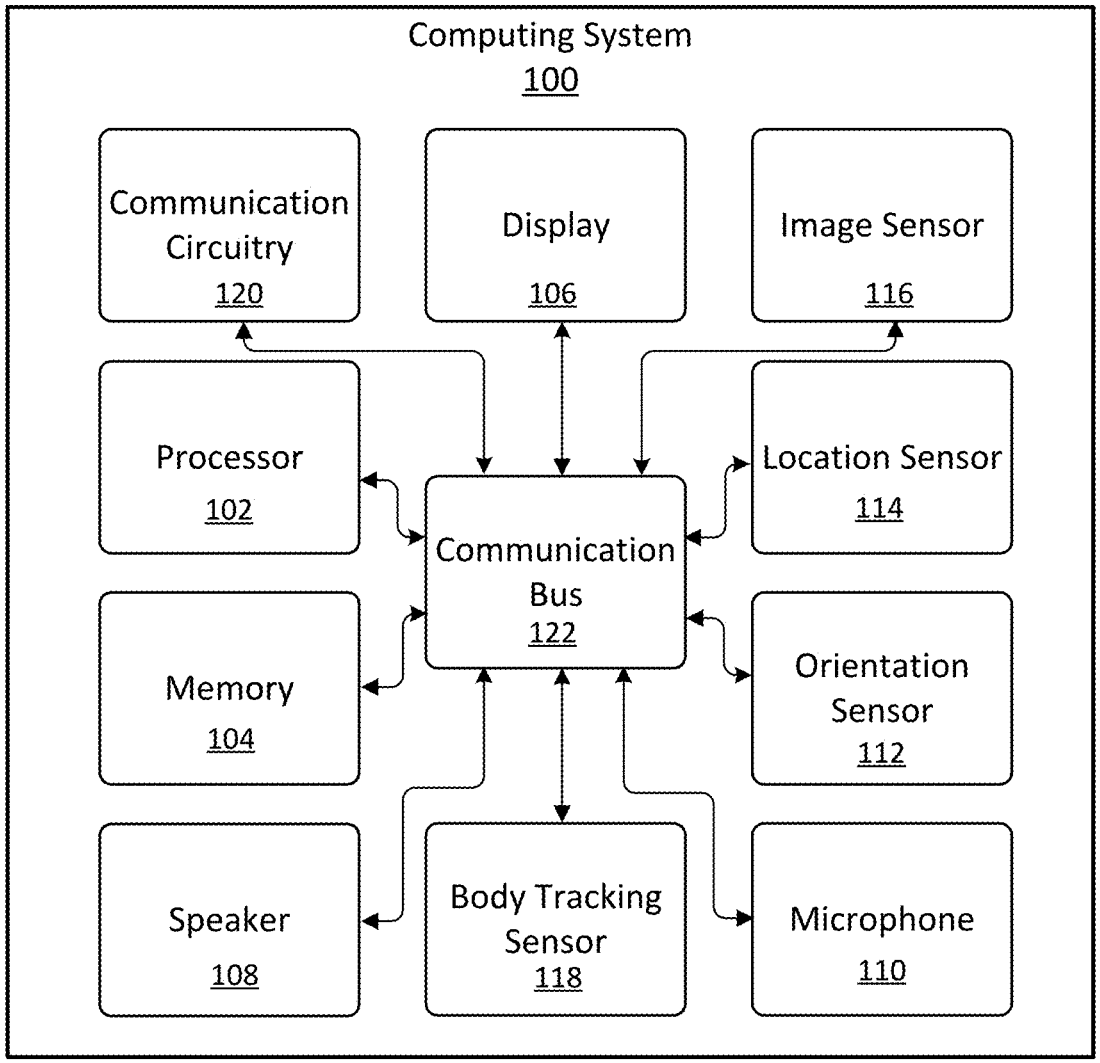
FIG. 1 illustrates an example block diagram of the computing system according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to presenting a view of the product (also referred to herein as an object) to a first user that incorporates annotations. In some examples, an annotation can be presented in accordance with (e.g., in response to) user input of a second user (e.g., a customer support person). In some examples, the annotations can be presented on the product (e.g., overlaid on the physical product or presented in proximity to the physical object and/or on a virtual representation of the physical product). For instance, in some examples, at a first computing device (a customer/client/user device) in communication with one or more input devices and a second computing device (a customer service representative device), one or more images can be captured using the one or more input devices. In some examples, an identity of a product can be determined using the one or more images. In some examples, the identity of the product can be transmitted to the second computing device. In some examples, an indication of a first input received at the second computing device can be received from the second computing device. In some examples, a first view of the product comprising a first annotation that corresponds to the first input received at the second computing device can be presented.

This also relates to user input of a first user (e.g., a customer support person) providing user input to enable presentation of annotations for a product of a second user. In some examples, at a first computing device (a customer service representative device) in communication with one or more input devices and a second computing device (a customer/client/user device), an identity of a product can be received from the second computing device. A first view of the product including a virtual representation of the product can be presented to the first user using the first computing device. In some examples, an indication of a first input can be detected using the one or more input devices in communication with the first computing device. The first input can comprise an interaction with the virtual representation of the product (e.g., a gesture). In some examples, an indication of the first input or a first annotation that corresponds to the first input can be transmitted to the second computing device (e.g., for use in displaying the annotation to the second user of the second computing device).

It is understood that although example annotations are primarily described that the annotations can additionally or alternatively be animations. Additionally it is understood that although the examples described herein primarily focus on annotations in the context of a customer service representative and a product, that the systems and methods described herein can be used for annotations or animations outside of the context of customer service and products (e.g., for annotation of objects generally). Additionally, it is understood that the annotation techniques described herein can be used for guided instructions without requiring input from a customer service representative.

FIG. 1 illustrates an example block diagram of a computing system 100 (alternatively referred to as a computing device or system) according to examples of the disclosure. In some examples, as illustrated in FIG. 1, computing system 100 includes processor 102, memory 104, display 106, speaker 108, microphone 110, orientation sensor 112, location sensor 114, image sensor 116, body tracking sensor 118, and communication circuitry 120, which optionally communicate over communication bus 122 of computing system 100. In some examples, computing system 100 can include more than one processor, more than one memory, more than one display, more than one speaker, more than one microphone, more than one orientation sensor, more than one location sensor, more than one image sensor, and/or more than one body tracking sensor, optionally communicating over more than one communication bus. Although FIG. 1 illustrates one example computing system, it is understood that, in some examples, multiple instances of computing system 100 (or variations on computing system 100) can be used by multiple users, and the different instances of the computing system can be in communication (e.g., via communication circuitry 120).

Processor(s) 102 can be configured to perform the processes described herein (e.g., process 500 and process 600). Processor(s) 102 include one or more general processors, one or more graphics processors, and/or one or more digital signal processors. In some examples, memory 104 is a non-transitory computer-readable storage medium (e.g., flash memory, random access memory, or other volatile or non-volatile memory or storage) that stores computer-readable instructions (e.g., programs) configured to be executed by processor(s) 102 to perform the processes described herein. In some examples, memory 104 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages, such as magnetic disks, optical discs based on CD, DVD, or Blu-ray technologies, as well as persistent solid-state memory such as flash, solid-state drives, and the like.

Computing System 100 also includes display(s) 106 (often referred to herein as a display generation component(s)). In some examples, display(s) 106 include a single display (e.g., a liquid-crystal display (LCD), organic light-emitting diode (OLED), or other types of display). In some examples, display(s) 106 includes multiple displays. In some examples, display(s) 106 can include a display with touch-sensing capability (e.g., a touch screen) or a projector (e.g., a holographic projector, a retinal projector, etc.). In some examples, computing system 100 includes microphones(s) 110 or other suitable audio sensors. Computing system 100 uses microphone(s) 110 to detect sound from the user and/or the real-world environment of the user. In some examples, microphone(s) 110 includes an array of microphones (a plurality of microphones) that optionally operate jointly, such as to identify ambient sound levels.

Computing system 100 includes orientation sensor(s) 112 for detecting orientation and/or movement of computing system 100 and location sensor(s) 114 configured to detect a location of computing system 100 and/or of display 106. For example, computing system 100 uses orientation sensor(s) 112 to track changes in the position and/or orientation of one or more fixed objects in the real-world environment. Orientation sensor(s) 112 optionally include one or more gyroscopes, one or more inertial measurement units, and/or one or more accelerometers. For example, location sensor(s) 114 optionally includes a global positioning satellite receiver to determine the computing system's absolute position in the physical world. In some examples, computing system 100 may determine its orientation and location using orientation sensor(s) 112, image sensor(s) 116, or both. For example, computing system 100 may perform a simultaneous localization and mapping (SLAM) technique, visual odometry (VO) technique, visual inertial odometry (VIO) technique, or the like.

Computing system 100 optionally includes image sensor(s) 116, which optionally include one or more visible light image sensor, such as charged coupled device (CCD) sensors and/or complementary metal-oxide-semiconductor (CMOS) sensors operable to obtain images of physical objects in the real-world environment. In some examples, image sensor(s) 116 also include one or more infrared sensors, such as a passive or active infrared sensor, configured to detect infrared light in the real-world environment. For example, an active infrared sensor includes an emitter configured to emit infrared light into the real-world environment. Image sensor(s) 116 also optionally include one or more cameras configured to capture movement of physical objects in the real-world environment. Image sensor(s) 116 also optionally include one or more depth sensors configured to detect the distance of physical objects from computing system 100. In some examples, information from one or more depth sensors allows the device to identify objects in the real-world environment and differentiate objects in the real-world environment from other objects in the real-world environment. In some examples, one or more depth sensors allow the computing system to determine the texture and/or topography of objects in the real-world environment. In some examples, computing system 100 uses CCD sensors, infrared sensors, and depth sensors in combination to detect the physical environment around computing system 100. In some examples, image sensor(s) 116 include a multiple image sensors working jointly and configured to capture different information of physical objects in the real-world environment. In some examples, computing system 100 uses image sensor(s) 116 to detect the position and orientation of one or more objects of a product in a real-world environment. For example, computing system 100 uses image sensor(s) 116 to track the position and orientation of one or more fixed objects in the real-world environment.

Computing system 100 optionally includes body tracking sensor(s) 118. In some examples, body tracking sensor(s) 118 optionally include hand and/or eye tracking sensors. Body tracking sensor(s) 118 are configured to track the position/location of one or more portions of the user's hands or eyes, and/or motions of one or more portions of the user's hands or eyes with respect to the real-world environment or an extended reality environment. In some examples, the body tracking sensor(s) 118 can use image sensor(s) 116 (e.g., one or more infrared cameras, three-dimensional cameras, depth cameras, etc.) that capture two-dimensional and three-dimensional information from the real-world including information about one or more hands or eyes (e.g., of a human user). In some examples, the hands can be resolved with sufficient resolution to distinguish fingers and their respective positions. In some examples, one or more image sensor(s) 116 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers and/or hands for input (e.g., gesture input) can be advantageous in that it does not require the user to touch, hold or wear any controller, sensors, or other active or passive circuitry for tracking. In some examples, the hands of the user are able to interact with the virtual objects in the three-dimensional environment (e.g., grabbing, moving, touching, pointing at virtual objects, etc.), optionally as if they were real physical objects in the physical environment.

Communication circuitry 120 optionally includes circuitry for communicating with electronic devices, networks (e.g., the Internet), intranets, a wired network and/or a wireless network, cellular networks and wireless local area networks (LANs), etc. Communication circuitry 120 optionally includes circuitry for communicating using near-field communication (NFC) and/or short-range communication (e.g., Bluetooth®).

It is understood that computing system 100 is not limited to the components and configuration of FIG. 1, but can include fewer, other, or additional components in multiple configurations. In some examples, computing system 100 may include or may be implemented as a head-mountable system that may enable a person to sense and/or interact with an extended reality (XR) environment by displaying the XR environment, such as using a projection-based system.

As described herein, computing system 100 enables a presentation of annotations for a physical object. In some examples, this physical object may include any physical object or electronic device for which a user is seeking customer service aid product. For instance, the physical object may be a consumer electronics product such as a mobile phone, a tablet, a laptop, or a computer. Additionally or alternatively, computing system 100 enables presentation of a virtual representation (e.g., a virtual object) of the product to one or more users. The annotations can enable a guided experience for customer support, among other applications. In some examples, the virtual representation of the product is displayed to a customer service representative such that the customer service representative is enabled to view and interact with a virtual object in their three-dimensional environment (e.g., similar to as if they were real physical objects in the physical environment of the customer service representative). Additionally or alternatively, computing system 100 enables a presentation of a virtual representation of the product (e.g., a virtual object) to a user (e.g., product owner), such that annotations can be presented to the user (e.g., corresponding to the inputs from the customer service representative). In some examples, the virtual representation of the product is presented with the user's physical product in a side-by-side presentation to enable annotation on either the physical product, the virtual representation, or both. In other examples, no virtual representation of the product may be presented to the user and annotations may be presented on the physical product. In some examples, the customer service representative is presented with a view of a second virtual representation of the product. A first virtual representation of the product can be representative of the state of the user's product and the second virtual representation of the product can be provided for the customer service representative to provide inputs for user-side annotations.

Figure 2A:
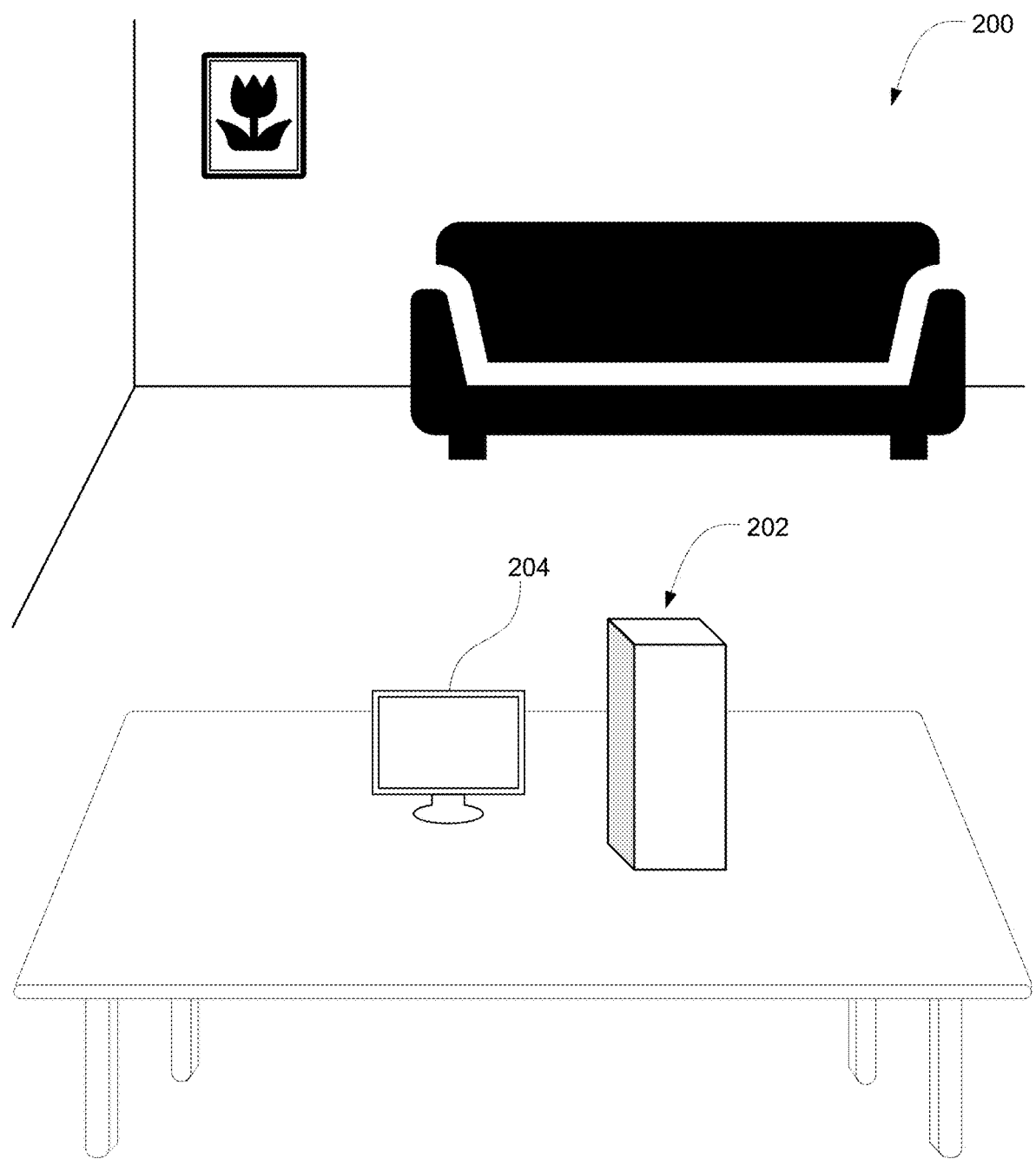
FIG. 2A illustrates an environment of a first user (e.g., a user of a product) according to examples of the disclosure.
Figure 2B:
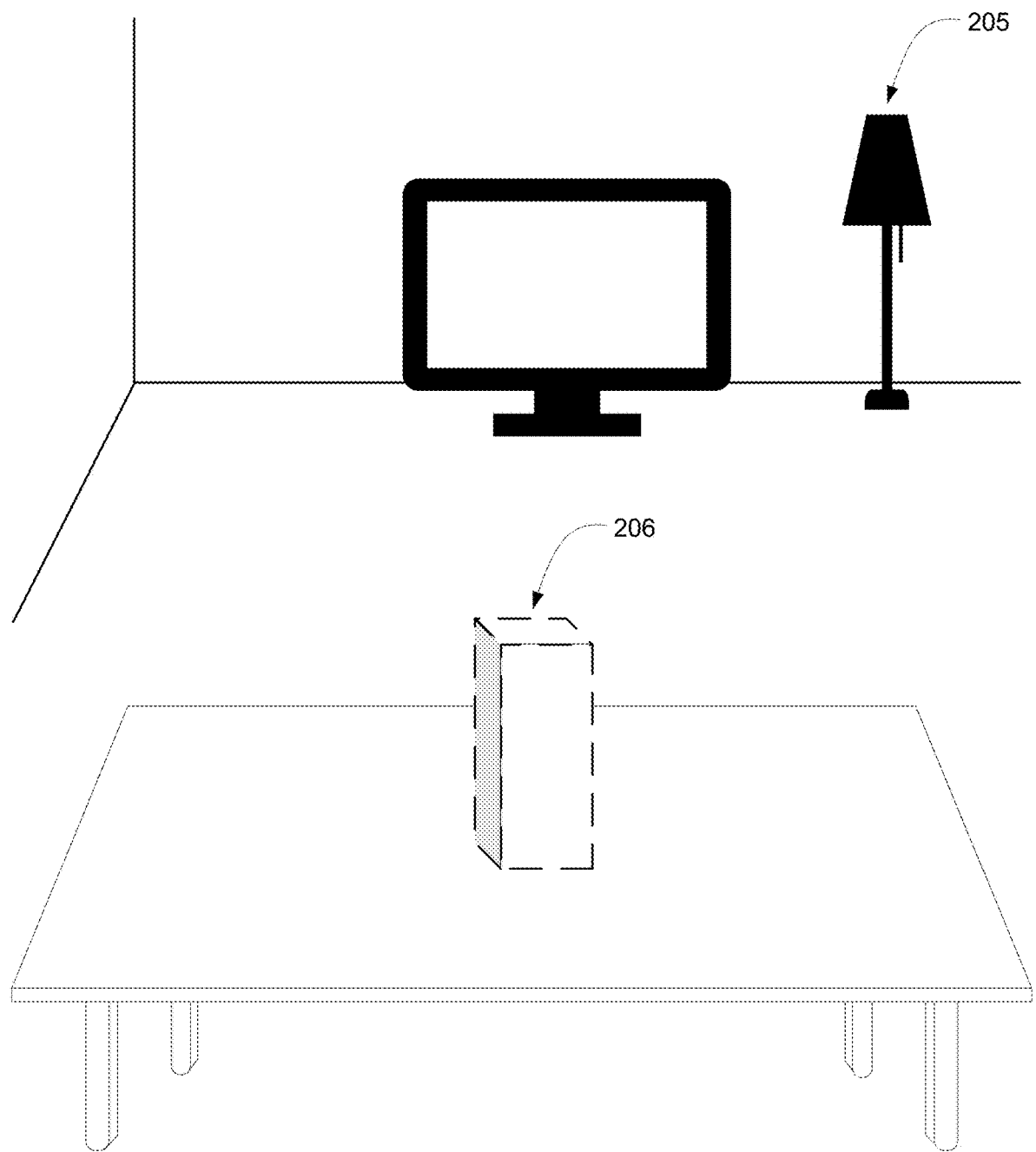
FIG. 2B illustrates an environment of a second user (e.g., a customer service representative) according to examples of the disclosure.

FIGS. 2A-2B illustrate example environments of a first user (e.g., an owner of a product) and a second user (e.g., a customer service representative) according to examples of the disclosure. In some examples, environment 200 is presented to the first user using a computing system (e.g., corresponding to computing system 100) to enable the presentation of an XR environment (e.g., including physical objects and/or virtual objects). Environment 200 may be presented in various ways. For instance, environment 200 may be displayed on a handheld device (e.g., phone, tablet, etc.) using images captured from the camera with virtual content optionally being overlaid. Alternatively, environment 200 may be viewed through a head-mounted display with an opaque display using pass-through video with virtual content optionally being overlaid composited with the pass-through video. Alternatively, environment 200 may be viewed through a transparent or semi-transparent display where the physical objects are directly viewed by the user through the display and over which virtual content is overlaid. In some examples, environment 200 is presented to the first user using a different computing system to enable the presentation of an XR environment. For instance, FIG. 2A illustrates an environment 200 of a user of a product according to examples of the disclosure. As shown in FIG. 2A, the user's environment includes physical objects, such as a picture of a flower, a couch, a table, a computing system including a computer 202 and a monitor 204.

In some examples, the first user is contacting a customer service representative for customer support related to computer 202 (e.g., referred to as the product or object). It should be understood that this is merely an example and the first user can be contacting a customer service representative for customer support related to one or more electronic devices such as a mobile device, a tablet, a laptop, a desktop computer, a display/monitor, a gaming system, a streaming device, or the like. In these examples, the first user's environment would include such electronic device in addition to or instead of computer 202. In some examples, computing system 100 captures the product for use in the customer service session (e.g., using sensors of computing system 100, such as image sensors 116), optionally upon the user initiating the customer service session. In some examples, computing system 100 identifies the product and/or a state of the product, and transmits the identity of the product and/or the state of the product to the customer service representative. It should be understood that this is merely an example, but in some examples, if a user is contacting the customer service representative regarding an alternative electronic device/product, that computing system 100 can capture and identify said electronic device/product. For instance, and as shown in FIG. 2A, computing system 100 captures one or more images of computer 202 using one or more input devices, such as image sensor(s) 116. Computing system 100 then determines the identity of the product using the one or more images. For instance, computing system 100 (e.g., processor 102 and/or a program or instructions in memory 104) can determine from the images that the product is computer 202. This identification may occur in various ways. In some examples, the user may identify the product (e.g., entering information about the product by selecting the product using a gesture, etc.). In some examples, the computing system may identify the product without user input. For example, the identification may include performing a computer vision technique that identifies the type of product (e.g., display, desktop computer, laptop, tablet, phone, etc.) or a particular model of the product (e.g., a desktop computer model X made by company Y) based on images from image sensor(s) 116. In some examples, the computing system 100 may further identify the product based on a user account associated with the computing system (e.g., computing system 100) also being associated with another product that corresponds to the identified type or model of the product (e.g., computer 202). In some examples, the computing system may identify the product from a catalog of products, for instance from one or more specific vendors. Computing system 100 then transmits the identity of the product (e.g., computer 202) to a second computing system (e.g., using communication circuitry 120), which can be a computing system similar to computing system 100 of the customer service representative. In some examples, the identity of the product received at the second computing system enables the second computing system to present a virtual representation of the product (e.g., computer 202) to the customer service representative within the customer service representative's physical environment (or an XR environment).

For instance, FIG. 2B illustrates a customer service representative environment 205 according to examples of the disclosure. As shown in FIG. 2B, the customer service representative's environment 205 includes physical objects, such as a lamp, a television, and a table, though in some examples, the environment can be an XR environment without physical objects. In some examples, virtual representation 206 of computer 202 is presented to the customer service representative within the customer service representative's environment 205 (e.g., on the table). In this way, the customer service representative is presented with a view of the user's product while maintaining the user's privacy (e.g., no images of the contents of the user's environment are transmitted to the customer service representative) and enabling the customer service representative to interact with virtual representation 206 (e.g., as described with reference to FIGS. 3A-4F). As described herein, in some examples, the state of the product can also be transmitted from the first computing system of the user and received by the second computing system of the customer service representative. As such the virtual representation of the product can be presented in a manner consistent with the state of the physical product (e.g., a realistic view of the physical configuration of the device, a representation of the removal of enclosures, housings, or other components, etc.).

Figure 3A:
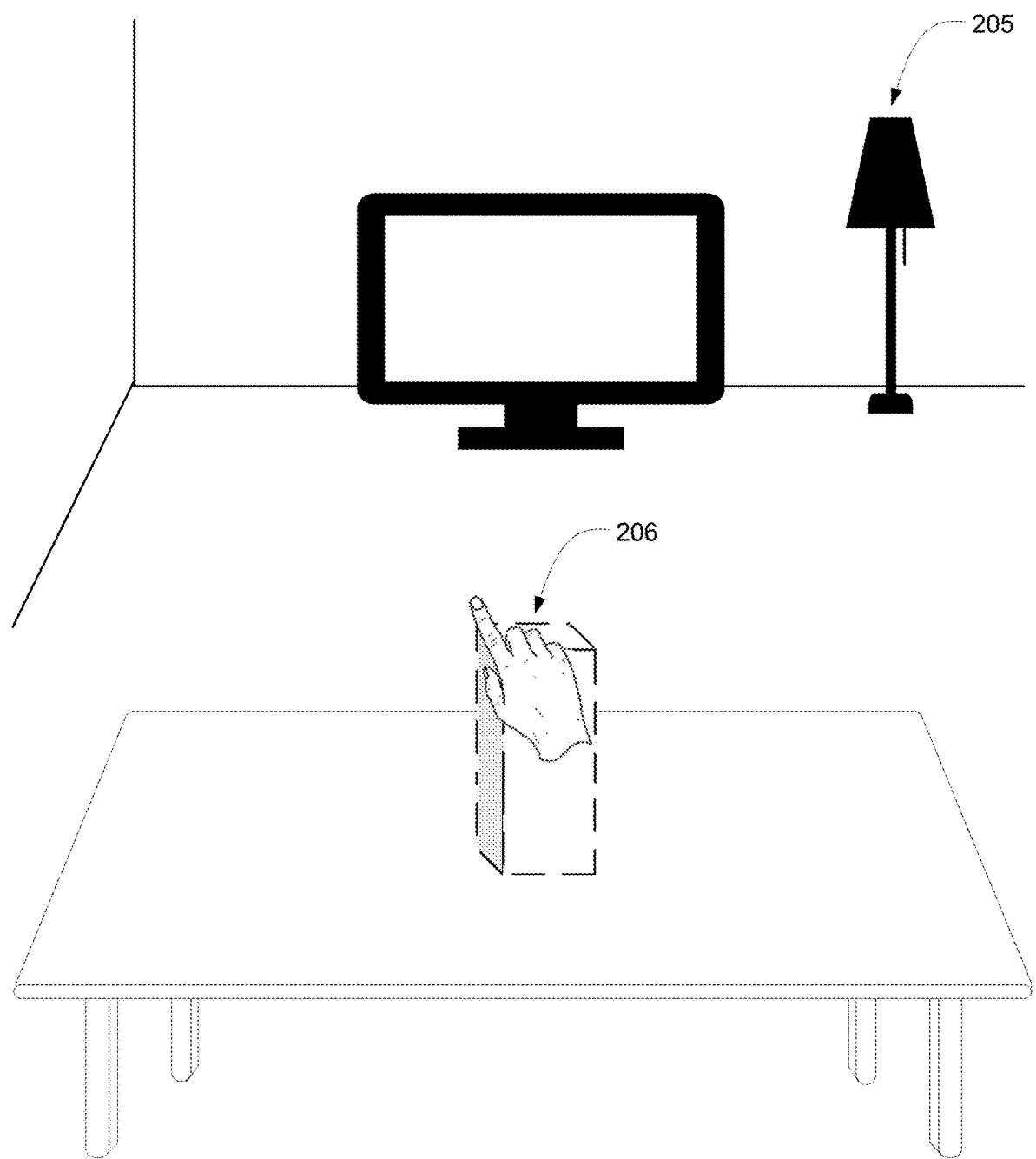
FIGS. 3A-3D illustrate additional views of an environment of the first user or an environment of the second user according to examples of the disclosure.

FIGS. 3A-3D illustrate additional views of an environment of the user of the product or an environment of the customer service representative according to examples of the disclosure. FIGS. 3A-3D correspond to a first example interaction in a customer service session. For instance, and as shown in FIG. 3A, the customer service representative interacts with virtual representation 206 to provide instructions for removal of the lid of the product. In some examples, the interaction can be a gesture of a hand of the customer service representative detected using the body tracking sensors 118 of the computing system of the customer service representative. In some examples, the gesture can be a tapping gesture (e.g., tapping the top of the housing of the virtual representation 206), a rotation gesture (e.g., rotation of the hand at a location of the housing corresponding to a handle of the virtual representation 206), or any other appropriate gesture. It is understood that these gestures are representative gestures, but that other gestures or other non-gesture inputs can be used.

Figure 3B:
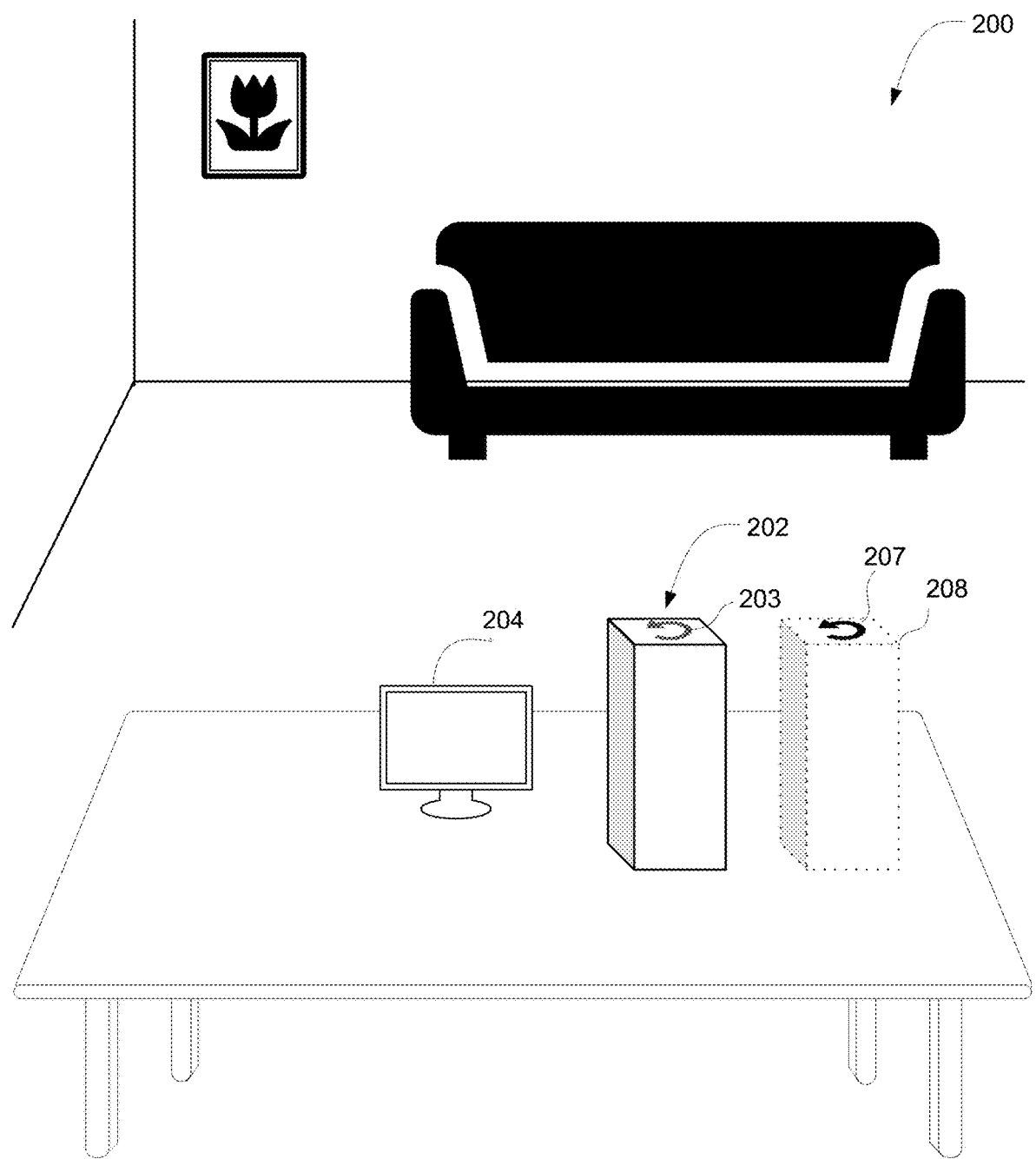

In accordance with the second computing system detecting the gesture of the customer service representative, the second computing system may transmit an indication of the gesture, an annotation associated with the detected gesture, an animation associated with the detected gesture, a component of the product or virtual representation targeted by the gesture, or the like. Subsequently, and as shown in FIG. 3B, the user's environment 200 is updated with an annotation corresponding to the customer service representative's action. In this way, the user can see a visual representation of an instruction (e.g., the steps the customer service representative is instructing the user to take). As shown in FIG. 3B, in some examples, the annotation may be presented directly on the physical product, such as computer 202 (e.g., a counterclockwise curved arrow 203 on computer 202). In some examples, the annotation may be an annotation/visualization to or on the physical product or can be an animation in 2D, 2.5D, or 3D on or corresponding to the product. In some examples, the annotation may be based on the customer service representative's input and may correspond to the detected gesture. For instance, if the customer service representative performs a gesture (e.g., a tap or rotation) at the location of the housing, the corresponding annotation may be a curved arrow displayed at the location of the housing corresponding to the respective gesture input of the customer service representative on the virtual representation of the product. As shown, counterclockwise curved arrow 203 annotation can identify the location and direction of the user input. In some examples, an animation can be presented showing the lifting off of the housing after rotation (e.g., a virtual housing lifting off of the physical product) with or without a virtual hand simulating and/or including a tool to perform the lifting off. In some examples, the presentation of the virtual hand or the tool (or other input device) may correspond to whether the customer service representative used a hand or a tool (or other input device) for providing input. In some examples, the animation may include a recording or representation of the customer service representative's interaction with the virtual representation. For example, the second computing system may record the body pose of the customer service representative determined using body tracking sensor 118 and transmit the recorded poses to the first computing system of the user. The first computing system may then replay those poses by, for example, presenting a virtual representation of the customer service representative's hands or tools interacting with computer 202. In some examples, these annotations and/or animations can be saved for future reference and/or replaying or resending (e.g., if the user requires additional annotation to complete a given step). The annotations and/or animations can be saved in an archive that is accessible by a single user, or by multiple users and/or user accounts. In some examples, complete guided instructions can be created that allow a user to step through guided instructions including animations without requiring a customer service representative interactively guide the user. In some examples, the guided instructions can be used for training or other education-related purposes.

Additionally or alternatively, the user's environment 200 can include a virtual representation 208 of the product. In some examples, as shown in FIG. 3B, the annotation or animation may be presented additionally or alternatively on the virtual representation 208 of the product (counterclockwise curved arrow 207). In some examples, presenting the annotation or animation of the virtual product may enable the user to view the annotation or animation without the user's physical interactions with the physical product obstructing the annotation or animation or without the annotation or animation obstructing the user's physical interactions. In some examples, the annotation or animation on (or corresponding to) the physical product and the annotation or animation on (or corresponding to) the virtual representation 208 can be the same. For example, FIG. 3B illustrates counterclockwise curved arrow 207 annotation (or animation) on both the physical product and the virtual representation. It is understood, however, that the presentation of the annotation or animation can be different between the physical product and the virtual representation and may include a virtual hand and/or tool performing the task. For instance, in some examples, an annotation may be presented on or corresponding to the physical product, whereas an animation may be presented on or corresponding to the virtual representation. In alternative examples, an annotation may be presented on or corresponding to the virtual representation, whereas an animation may be presented on or corresponding to the physical product.

In some examples, the presentation of the annotation or animation may change during a user's interaction with a physical product. For instance, in the example of FIGS. 2A-2B, the presentation of the annotation and/or animation including the curved arrow and subsequently an annotation and/or animation of an upward arrow guiding the user to lift the lid (or an animation of the lid lifting up). In some examples, the computing system may detect the user interacting with the physical product and rotating the handle on top of the lid while the curved arrow annotation is presented. In some examples, after detecting the rotation of the handle of the physical product, the computing system may present a subsequent animation or a modified animation with arrows pointing upward to lift the lid off or an animation of a virtual lid lifting up. However, this example is not intended to be limiting and one skilled in the art would understand various animations/annotations may be presented.

Figure 3C:
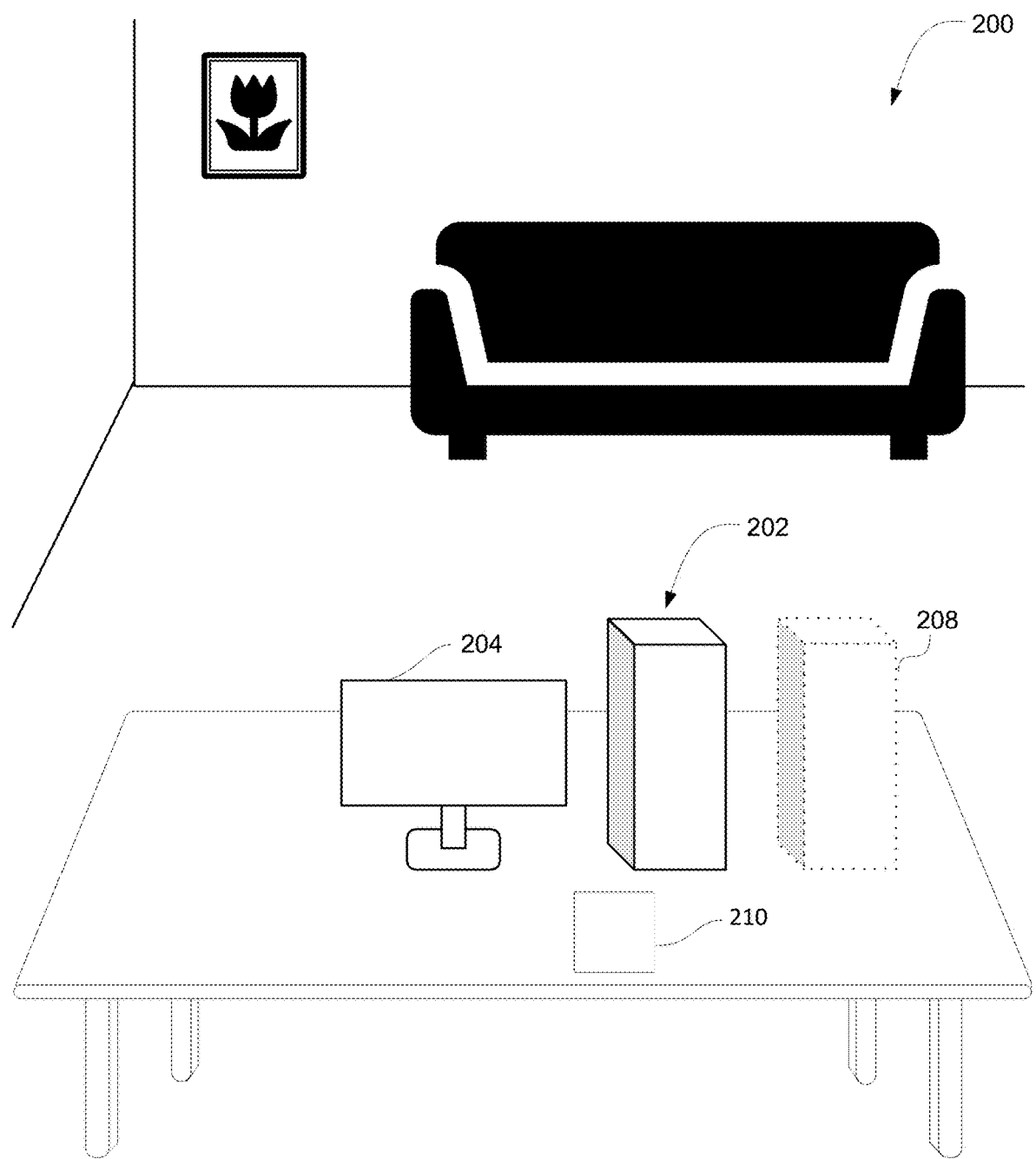
Figure 3D:
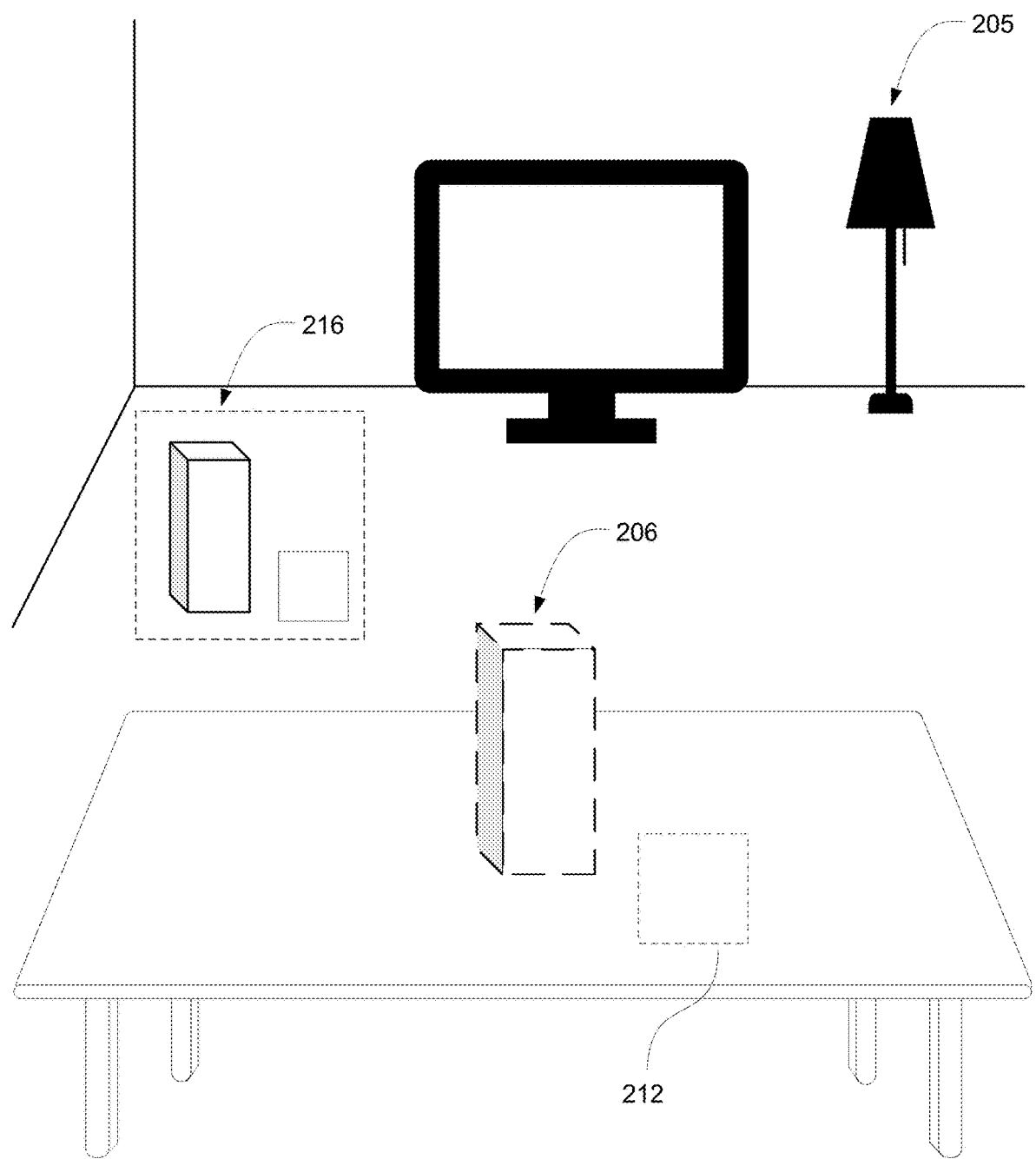
Figure 4A:
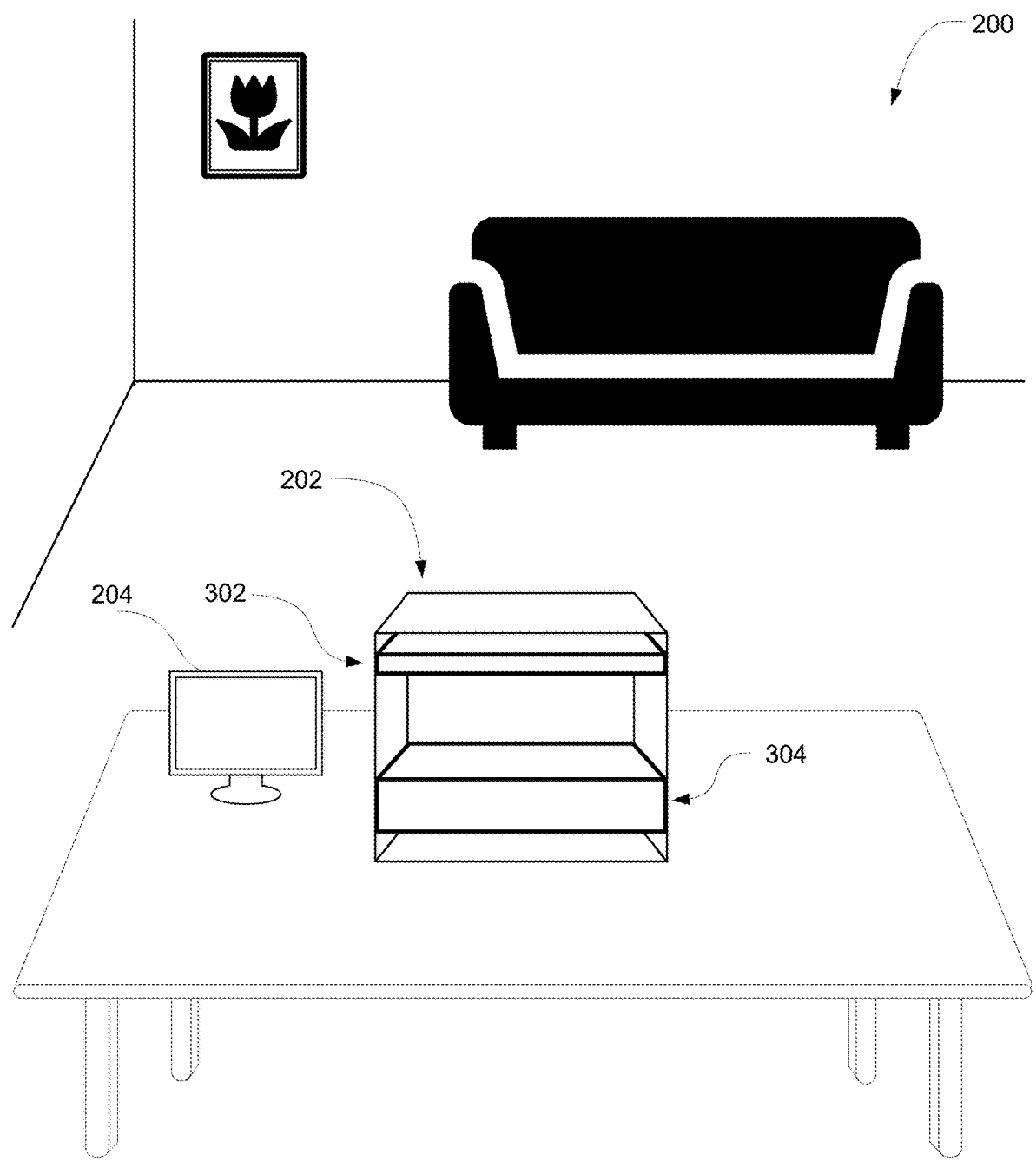
FIGS. 4A-4F illustrate additional views of an environment of the first user or an environment of the second user according to examples of the disclosure.

In some examples, and as shown in FIG. 3C, the user may remove a lid 210 of computer 202, as instructed by the customer service representative. For instance, lid 210 may be laid by the user upon the table. Additionally, the view of the physical product in FIG. 3C presents computer 202 without the lid (e.g., showing the internal contents of computer 202, such as shown in FIG. 4A). Following this user action, in some examples, the annotation(s) or animation(s) may be removed. Alternatively, the annotations or animations may remain until further action is taken. For instance, and in some examples, the annotation or animation may remain until the user completes the task. In alternative examples, the annotation or animation may remain until the user provides input to dismiss the annotation or animation (e.g., gesture, buttons, verbal commands, etc.). In alternative examples, the annotation or animation may remain until the customer service representative receives feedback that the task has been completed. Furthermore, computing system 100 may update the state of the user's product and transmit the update to the customer representative's computing system. This update may occur in response to user action or some other trigger that computing system 100 receives. As shown in FIG. 3D, the customer service representative's computing system may update environment 205 to reflect the user action and to show the virtual representation 206 without a lid and a virtual representation 212 of the lid laid upon the table.

In some examples, multiple virtual representations of the product are presented to the customer service representative. In some examples, a first representation of the product can be representative of the state of the user's physical product and a second virtual representation of the product can be provided for the customer service representative to provide inputs for user-side annotations or animations. In some examples, one of the two virtual representations presented to the customer service representative can be displayed in a picture-in-picture window 216. In some examples, the first virtual representation or the second virtual representation (optionally in a picture-in-picture window) can be hidden from view or revealed depending on the circumstances. For example, both the first and second virtual representations may be displayed when necessary (e.g., to shown the state of the user device to the customer service representative when the state of the user product diverges from the representation of the product used for input from the customer service representative), whereas only one virtual representation may presented when the state of the user's product is synchronized with the virtual representation used for input from the customer service representative. In some examples, both virtual representations of the product are visible to the customer service representative.

Although FIGS. 3A-3D illustrate annotations (or animations) for the user, it is understood that, in some examples, annotations or animations may also be presented with the virtual representation (or multiple virtual representations) at the customer service representative side. In some examples, the annotation or animation presented to the user is also presented on the virtual representation of the state of the user's product on the customer service side. Additionally or alternatively, the same or a different annotation (or animation) may be presented on the virtual representation of the product visible to the customer service representative. In some examples, when presented on the customer service side, the annotation or animation may be cleared when the computing system receives an indication that the user completed the task corresponding to the annotation/animation. For example, the curved arrow shown in FIG. 3B may be presented on one or both virtual representations presented on the customer service side and may be cleared when the user removes the lid. Alternatively, the annotation or animation may be cleared when the customer service representative provides an input to remove the annotation and/or in response to another trigger. For instance, the user may separately indicate that the lid has been removed or request additional guidance from the customer service representative (e.g., a subsequent annotation or animation).

Figure 4B:
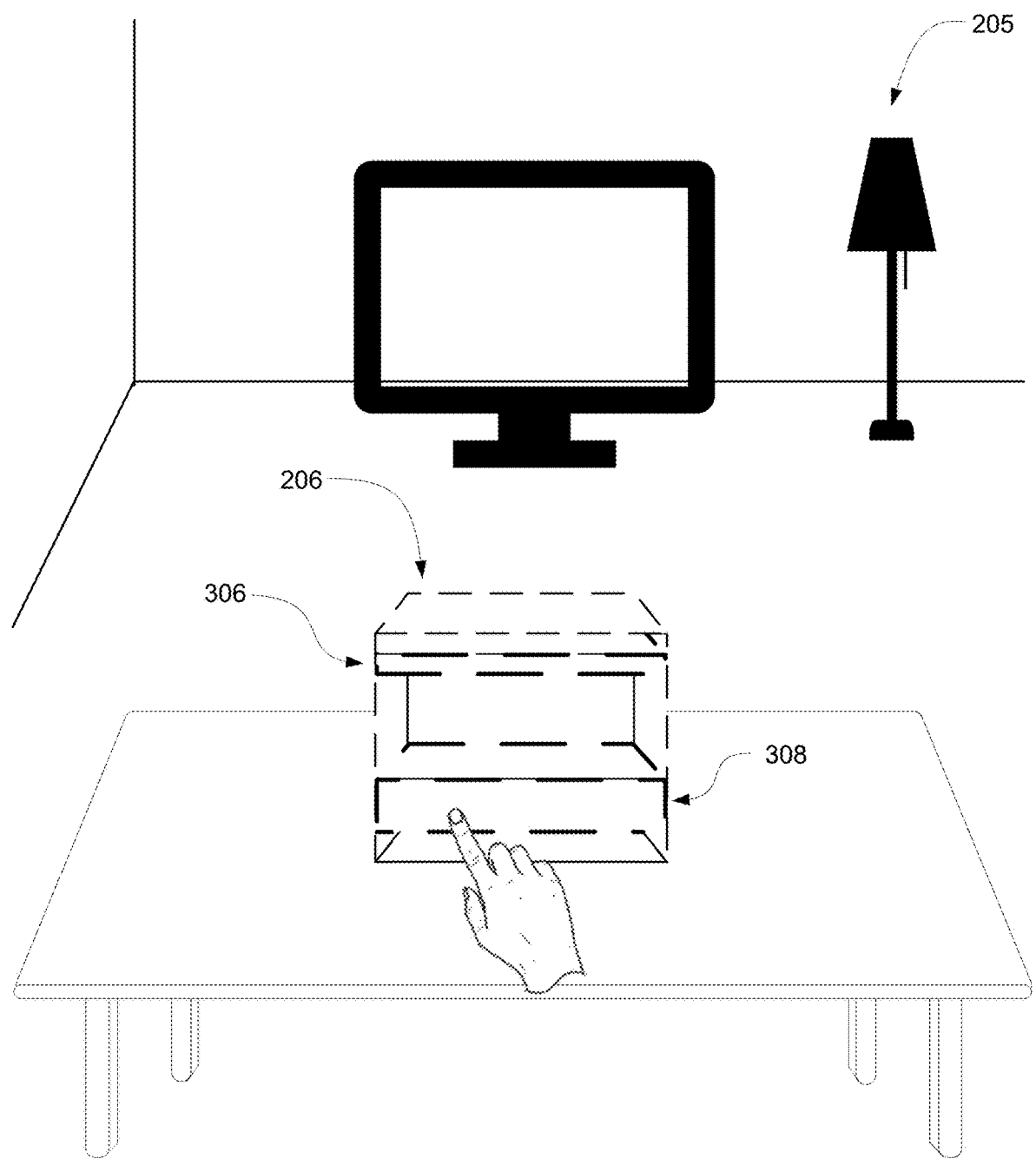

FIGS. 4A-4F illustrate additional views of an environment 200 of the user of the product or an environment 205 of the customer service representative according to examples of the disclosure. As described herein, in some examples, the customer service representative may provide further inputs using the virtual representation of the product to provide further guidance or instructions to the user (e.g., using subsequent annotations or animations). For instance, FIG. 4A illustrates a view of the computer 202 in an updated state after removing lid 210. As shown in FIG. 4A, in the updated state, multiple internal components of computer 202 are presented, including board 302 and board 304. It is understood that boards 302 and 304 are exemplary components, but other components may be presented. As noted above, in some examples, computing system 100 (e.g., using processor 102 and/or a program or instructions in memory 104 executed by processor 102) can determine the user's product(s) and corresponding state (e.g., the updated state). The updated state can be transmitted to the customer service representative. Accordingly, and as shown in FIG. 4B, the customer service representative's view of the virtual representation of the product can be updated to reflect the update of the state of the user's product. For example, FIG. 4B shows virtual representation 206 of the product with an internal view of virtual representations of the corresponding boards 306 and 308.

The customer representative may provide further user input (e.g., a second input following the user input to remove the lid) to continue providing guided support to the user. For instance, and as shown in FIG. 4B, the customer service representative interacts with board 308 to remove it from the product. In some examples, the interaction can be a gesture of a hand of the customer service representative detected using the body tracking sensors 118 of the computer device of the customer service representative. In some examples, the gesture can be a tapping gesture (e.g., tapping the virtual representation of board 308) or a pulling gesture (e.g., grabbing of the hand at a location of the housing corresponding to the virtual representation of board 308 and pulling the hand away from the virtual representation 206). It is understood, as noted above, that these gestures are representative gestures, but that other gestures or other non-gesture inputs can be used.

Figure 4C:
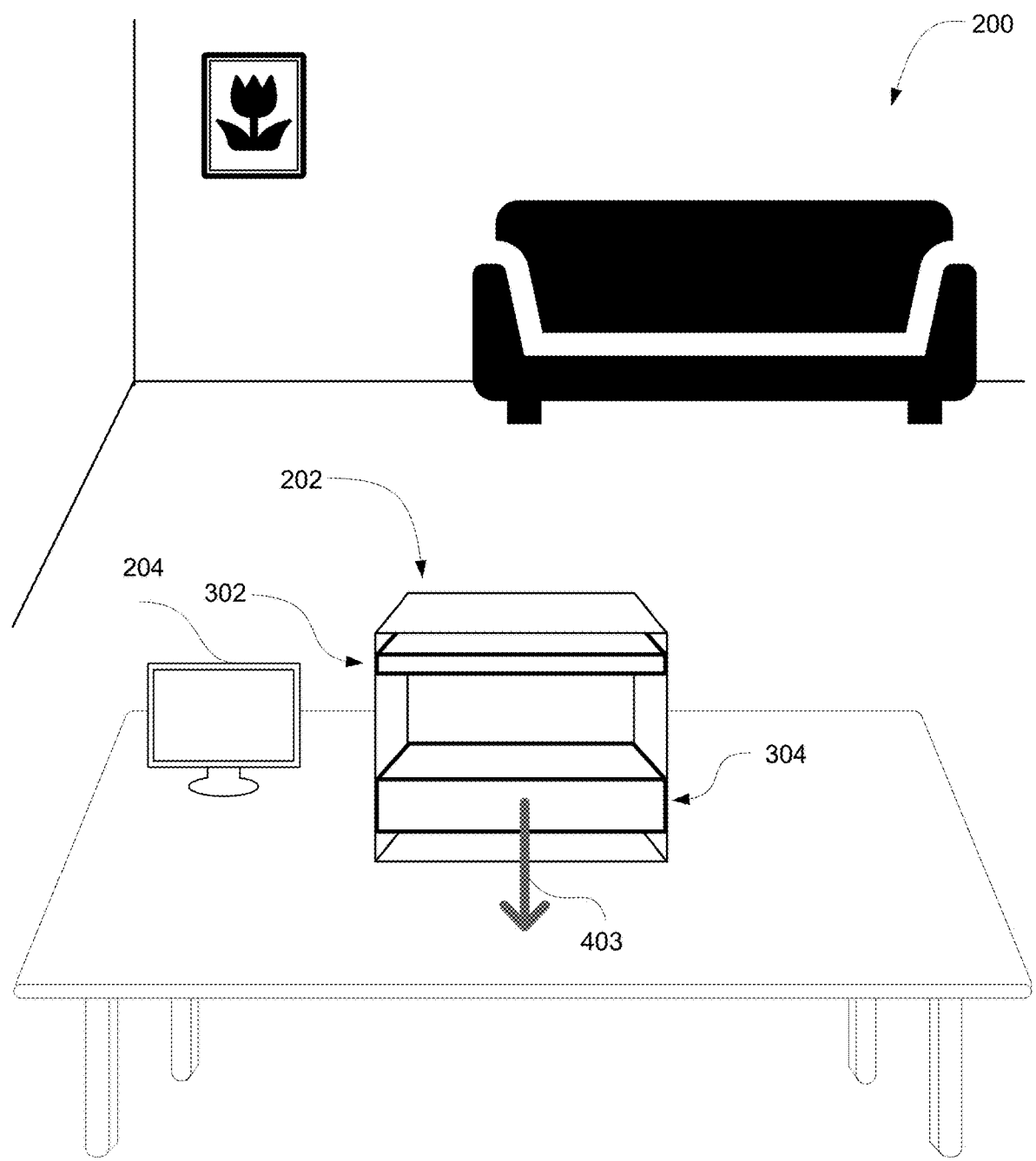

The inputs from the customer service representative can cause presentation of an annotation or animation to the user. For example, tapping can cause an annotation of board 304 indicating selection of virtual representation of board 308. The annotation can include highlighting or outlining board 304, or otherwise changing the appearance of the board to indicate a selection. In some examples, the pulling gesture can cause display of an annotation or animation guiding a user to remove board 304. For example, as shown in FIG. 4C, a second annotation is presented to user's environment 200 to instruct the user to remove board 304 that corresponds to the customer service representative's action on virtual representation of board 308. In some examples, virtual arrow 403 can be presented from board 304 showing the pulling direction to remove board 304. In some examples, an animation of a virtual board from the location of the physical board may be shown and may include a virtual hand performing the pulling and/or a virtual tool used for removing the board. As described herein, in some examples, the annotation or animation may be presented with the physical product (e.g., on the product, emanating from the product or near the product) and/or may be presented with the virtual representation presented concurrently in environment 200. In some examples, presenting the annotation or animation on the virtual product may enable viewing the annotation or animation without the user's physical interactions with the product obstructing the annotation or animation or without the annotations or animations obstructing the user's physical interactions. In some examples, the annotations or animations on (or corresponding to) the physical product and the annotations or animations on (or corresponding to) the virtual representation can be the same. In some examples, the annotations or animations on (or corresponding to) the physical product and the annotations or animations on (or corresponding to) the virtual representation can be different.

Figure 4D:
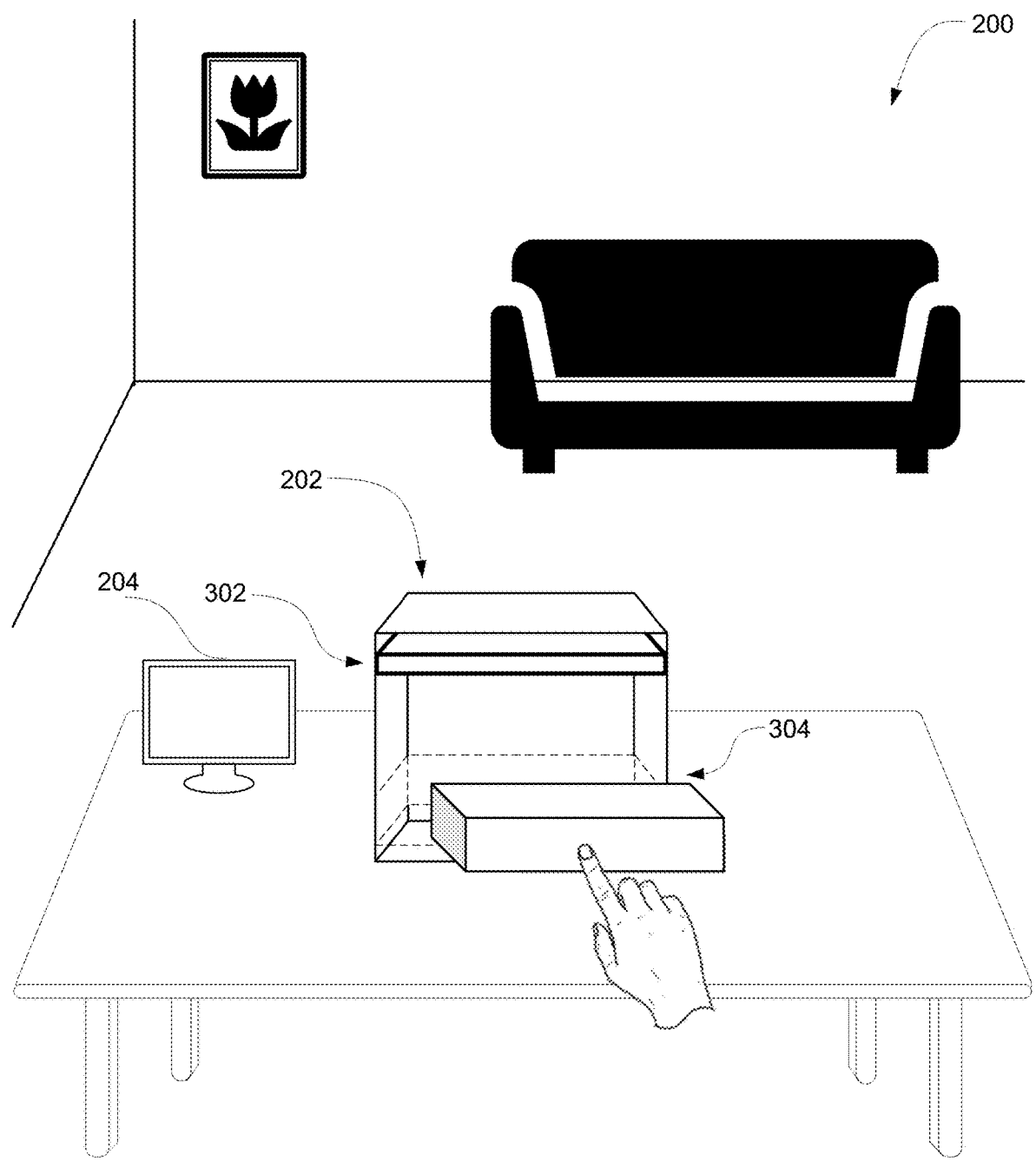

In some examples, the user may proceed with the removal of board 304. For instance, and as shown in FIG. 4D, the user begins to remove board 304. In some examples, and as shown in FIG. 4D, when the user removes board 304, the annotation or animation ceases to be presented. However, and as noted above, the annotation or animation may remain until a later trigger in some examples. For instance, and as noted above, the annotation or animation may remain until the user provides input to dismiss the annotation or animation (e.g., gestures, buttons, verbal commands, etc.). In alternative examples, the annotation or animation may remain until the customer service representative receives feedback that the task has been completed. Additionally, in some example, the customer service representative can initiate moving to the next step in the procedure using user interface controls presented to the customer service representative.

Figure 4E:
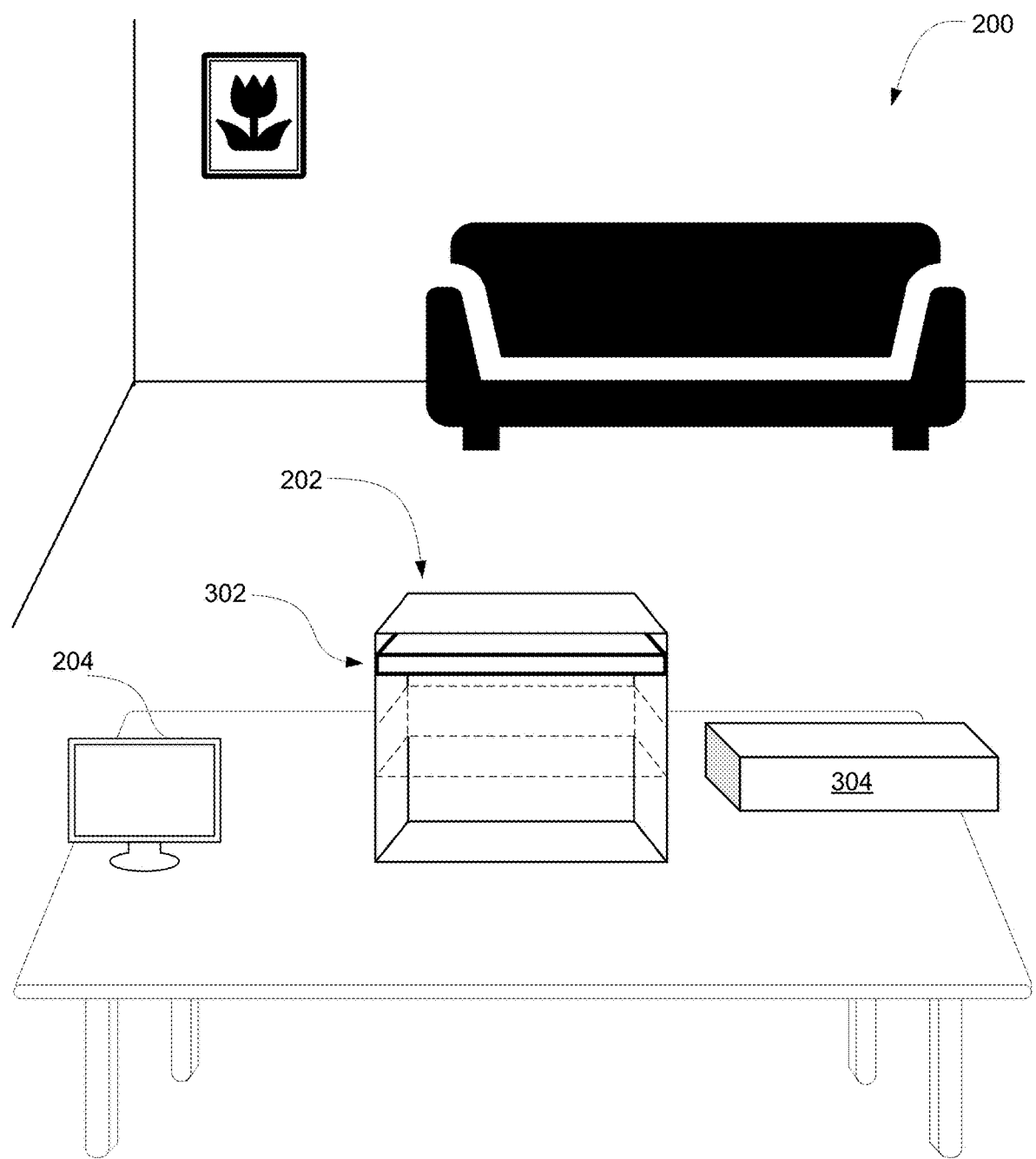
Figure 4F:
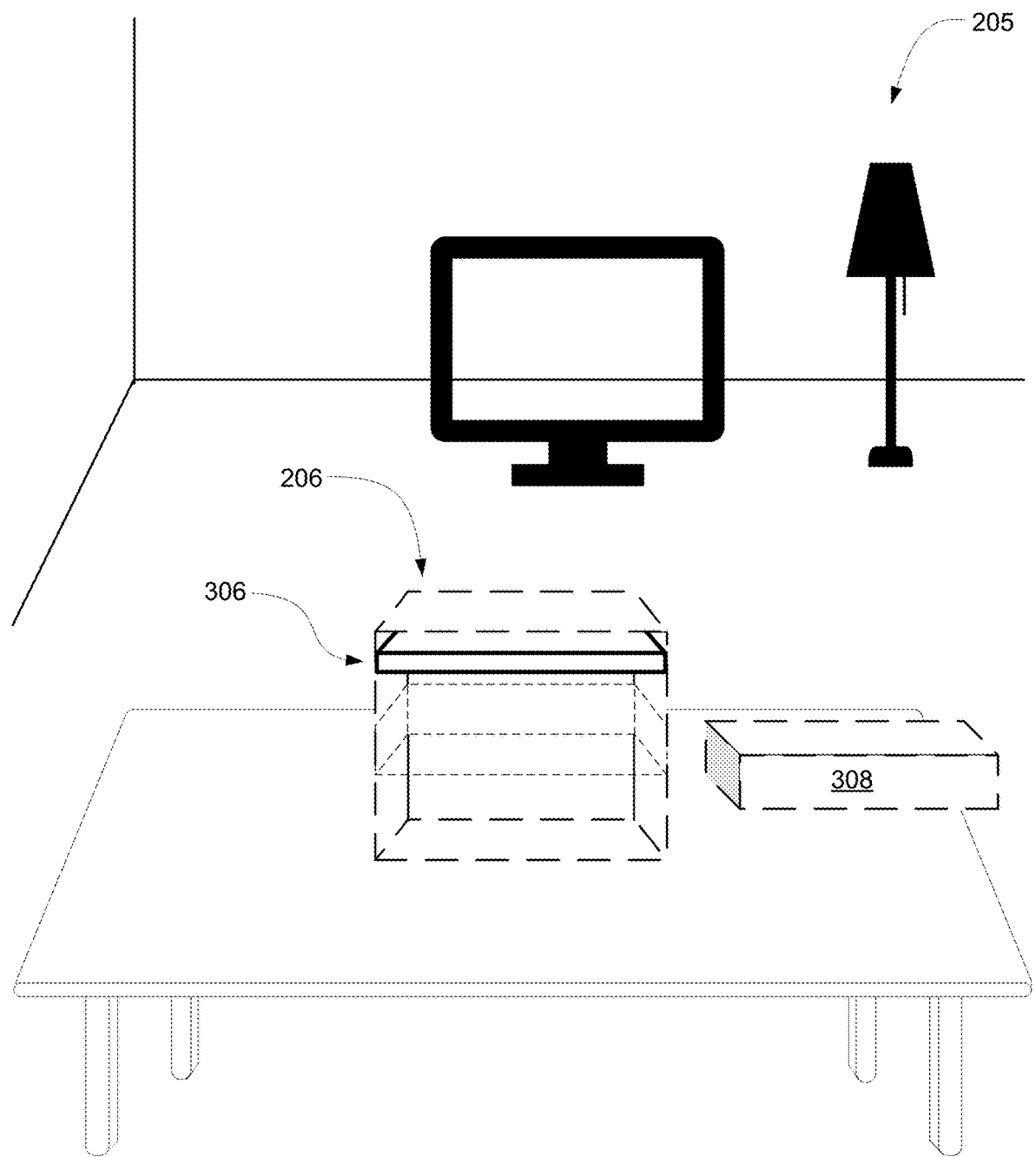

In some examples, and as shown in FIG. 4E, the user removes board 304 and places board 304 on the table next to computer 202. Computing system 100 can determine that the board 304 is removed from computer 202 (e.g., using image sensor(s) 116) and/or is placed within the user's environment. The updated status of computer 202 can be transmitted to the customer service representative's computing system to update a virtual representation presented in environment 205 accordingly. For instance, and as shown in FIG. 4F, the customer service representative's environment is updated showing virtual representation 206 having board 308 removed and placed next to virtual representation 206 on the table.

While the examples described herein primarily include a user (e.g., a customer) interacting with a customer service representative, it should be appreciated that the same or a similar interaction can occur between any two or more users. For example, when authorized by a user, a computing system of a first user may identify a physical object in the first user's environment along with its state, transmit the identity of the object and state to a computing system of a second user (e.g., a friend or family member of the first user), and receive annotations, animations, gestures, or combinations thereof from the computing system of the second user in response to interactions from the second user with a virtual representation of the physical object. In some examples, the computing system of the first user may further transmit the identification of the object and state to one or more computing systems of other users and receive annotations, animations, gestures, or combinations thereof from the one or more computing systems in response to interactions from the other users with corresponding virtual representations of the physical object. It should be noted that the computing system identifies only physical objects within the user's environment and does not identify or enable the computer service representative to see the user's environment. In this way, the privacy of the user is maintained.

In some examples, the second user (e.g., customer service representative) may record their interactions with the virtual representation of the object as, for example, a set of instructions to be performed. The set of instructions may include an ordered series of gestures, annotations, animations, or combinations thereof to be presented to a user in association with a physical object or virtual representation. This advantageously allows appropriate instructions to be given to a user without a customer service representative having to repeat the interactions. In some examples, a user may be presented with the recorded set of instructions without being in communication with a customer service representative. In these examples, the user may be presented with a set of instructions corresponding to the identity of their object and its state. For example, computing system may present the first gesture, animation, or annotation and provide the user with the ability to progress forward through the instructions at a desired rate or time (e.g., using user interface controls presented in the XR environment to advance forward or backward through the instructions). Additionally or alternatively, the computing system of the user may automatically progress through the instructions in response to detecting completion of a corresponding task, as described above. In some examples, the computing system may include built-in guided experiences that do not require any interaction with a customer service representative. In other words, these built-in guided experiences do not require a particular customer service representative to pre-record any behavior. In particular, these built-in guided experiences represent a walk-through or tutorial for common learning and/or repair experiences.

In some examples, such as when working with a mobile device, tablet, laptop or desktop (among other products/objects), additional tools may be required to complete a diagnostic or repair. In some examples, the user's computing system can identify these tools in addition to identifying the product and transmit information regarding the tools (e.g., identity, state, etc.) of the tools to the customer service representative (without sending images of the user's physical environment to the customer service representative). As described herein, the annotations and/or animations can be presented to the user for the products, for the tools, and/or for both. For example, the customer service representative may be able to cause an animation to help a user identity a tool in the environment and/or an animation showing how to use the tool to perform a given step. Alternatively, the customer service representative may save the instructions to computing system 100 such that the user can access the instructions at a later time and repair the product (e.g., when the computing system detects the product and the tools necessary for the repair). In examples, the computing system may include an archive full of instructions such that users may access and use the instructions without having to contact a customer service representative to help. Alternatively, users may view the archive for educational purposes. In instances, the guided instructions may include a step-by-step procedure that the user can step through. In examples, users may have access to certain archives based on a membership basis or product purchase.

Figure 5:
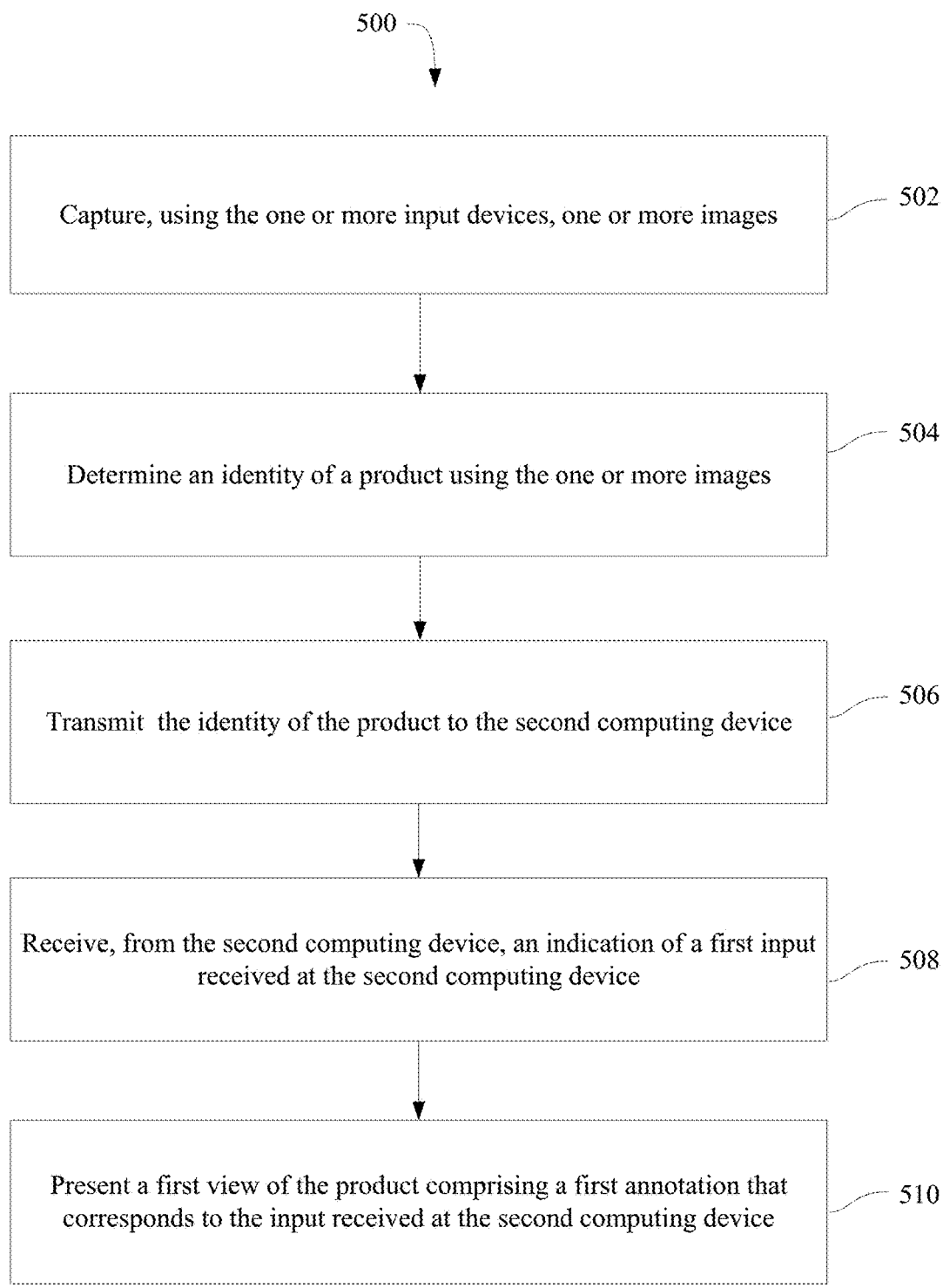
FIG. 5 illustrates an example process for presenting a first view of a product including an annotation according to examples of the disclosure.

As noted above, in some examples, an annotation or animation may be shared using one or more virtual representations of a physical product. FIG. 5 illustrates an example process for presenting a first view of a product according to examples of the disclosure. Process 500 is optionally performed at a first computing device (e.g., a user's electronic device or computing system corresponding to computing system 100) in communication with one or more input devices and a second computing device an electronic device (e.g., a customer service representative's electronic device or system corresponding to computing system 100). Some operations in process 500 are optionally combined and/or optionally omitted and/or optionally changed, in some examples. In some examples, process 500 is performed by processor 102 and memory 104. For instance, at 502, one or more images are captured using the one or more input devices (e.g., image sensor(s) 116). At 504, an identity of a product is determined using the one or more images (e.g., using a catalog of products and/or shared user account). At 506, the identity of the product is transmitted to the second computing device (e.g., without transmitting one or images of the user's environment). At 508, an indication of a first input (e.g., user input from a customer service representative) is received from the second computing device. In some examples, the indication can be a gesture itself, an annotation determined by the second computing device based on the input, or an animation determined by the second computing device based on the input, location of the input, or combinations thereof. At 510, a first view of the product is presented (e.g., to the user) comprising a first annotation that corresponds to the input received at the second computing device. In some examples, the annotation can also include a representation of the customer service representative (e.g., their hands), a device used by the customer service representative, or the like.

Additionally or alternatively, in some examples, the process further includes determining a first state of the product using the one or more images and transmitting the first state of the product to the second computing device. Presenting the first view of the product can include a representation of the product in the first state. In some examples, the first state of the product may be received from the product. For example, the product may determine its current state and communicate that state to the first computing device.

Additionally or alternatively, in some examples, the process further includes, while presenting the first view of the product comprising the first annotation, detecting, using the one or more input devices, a modification of the product corresponding to the first annotation, determining a second state of the product, and transmitting the second state of the product to the second computing device.

Additionally or alternatively, in some examples, the process further includes, in accordance with detecting the modification of the product, presenting a second view of the product including a representation of the product in the second state of the product and ceasing presentation of the first annotation.

Additionally or alternatively, in some examples, the process further includes receiving from the second computing device an indication of a second input received at the second computing device and presenting a third view of the product comprising a second annotation that corresponds to the second input received at the second computing device.

Additionally or alternatively, in some examples, the first input comprises a rotation input at a respective location corresponding to a virtual representation of the product at the second computing device, and the first annotation comprises a virtual arrow having a curved shape representing the rotation at the respective location corresponding to the first view of the product.

Additionally or alternatively, in some examples, presenting the first view comprises displaying the product using the one or more images. Additionally or alternatively, in some examples, the first view is presented through a transparent or translucent display.

Additionally or alternatively, in some examples the first annotation comprises an animation on the product or corresponding to the product presented in the first view of the product. Additionally or alternatively, in some examples, the method further includes presenting a virtual representation of the product concurrently with the first view of the product.

Additionally or alternatively, in some examples, presenting the first view of the product comprising the first annotation comprises presenting the first annotation on the product, and the process can further include presenting the same first annotation on the virtual representation of the product. Additionally or alternatively, in some examples, presenting the first view of the product comprising the first annotation comprises presenting the first annotation on the product, and the process can further include presenting a second annotation, different from the first annotation, on the virtual representation of the product. In some examples, the first view of the product can comprise a first animation and the second view of the product can comprise the first animation. In some examples, the first view of the product can comprise a first animation and the second view of the product can comprise a second animation.

Additionally or alternatively, in some examples, determining the identity of the product can include determining the identity based a user account shared by the product and the first computing device and/or a catalog of products.

Additionally or alternatively, in some examples, the first input comprises a gesture input at a respective location corresponding to a virtual representation of the product at the second computing device, and the first annotation corresponds to the gesture input and the respective location corresponding to the first view of the product.

Additionally or alternatively, in some examples, the identity of the object is transmitted to the second computing device without transmitting the one or more images.

Some examples of the disclosure can be directed to an electronic device comprising one or more processors; memory; and one or more programs. The one or more programs can be stored in the memory and can be configured to be executed by the one or more processors. The one or more programs can include instructions for performing any of the aforementioned processes. Some examples of the disclosure can be directed to a non-transitory computer readable storage medium storing one or more programs. The one or more programs can comprise instructions, which when executed by one or more processors of an electronic device, can cause the electronic device to perform any of the aforementioned processes.

Figure 6:
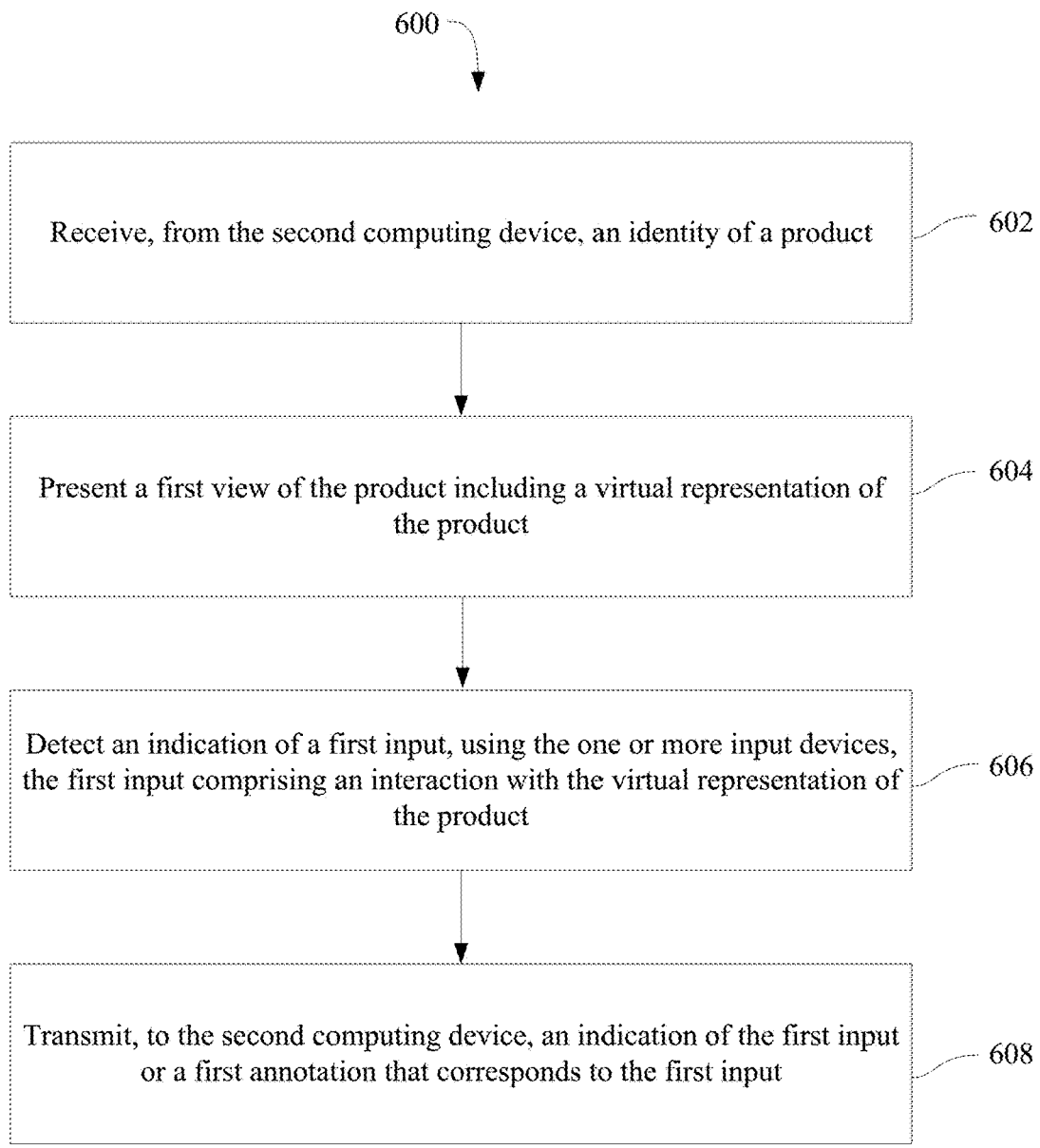
FIG. 6 illustrates an example process for transmitting an indication or an annotation that corresponds to a first input according to examples of the disclosure.

As noted above, in some examples, an annotation may be shared using the virtual representation of a physical product. FIG. 6 illustrates an example process for transmitting an indication or annotation that corresponds to a first input according to examples of the disclosure. Process 600 is optionally performed at a first computing device (e.g., a customer service representative's electronic device or computing system corresponding to computing system 100) in communication with one or more input devices and a second computing device (e.g., a user's electronic device or computing system corresponding to computing system 100). Some operations in process 600 are optionally combined and/or optionally omitted and/or optionally changed, in some examples. In some examples, process 600 is performed by processor 102 and memory 104. For instance, at 602, an identity of a product is received from the second computing device. At 604, a first view of the product is presented including a virtual representation of the product. At 606, an indication of a first input is detected using the one or more input devices, where the first input comprises an interaction (of the customer service representative) with the virtual representation of the product. At 608, an indication of the first input or a first annotation that corresponds to the first input is transmitted to the second computing device.

Additionally or alternatively, in some examples, presenting the first view further includes presenting the first annotation that corresponds to the first input.

Additionally or alternatively, in some examples, the process further includes receiving, from the second computing device, a first state of the product. Presenting the first view of the product can include the virtual representation of the product in the first state.

Additionally or alternatively, in some examples, the process further includes receiving, from the second computing device, a second state of the product, the second state corresponding to a modification of the product detected by the second computing device corresponding to the first annotation, presenting a second view of the product including the virtual representation of the product in the second state of the product, and ceasing presentation of the first annotation. Additionally or alternatively, in some examples, the process further includes detecting an indication of a second input using the one or more input devices and transmitting the indication of the second input to the second computing device or a second annotation that corresponds to the second input. Additionally or alternatively, in some examples, presenting the second view further includes presenting the second annotation that corresponds to the second input.

Additionally or alternatively, in some examples, the first input comprises a rotation input at respective location corresponding to the virtual representation of the product, and the first annotation comprises a virtual arrow having a curved shape representing the rotation at the respective location corresponding to a view of the product presented at the second computing device. Additionally or alternatively, in some examples, the first annotation comprises an animation on or corresponding to the virtual representation of the product.

Additionally or alternatively, in some examples, the process further includes presenting a second view of the product including a second virtual representation of the product concurrently with the first view of the product.

Additionally or alternatively, in some examples, the user input is detected interacting with the virtual representation of the product and the second virtual representation of the product represents a state of the product detected by the second computing device.

Additionally or alternatively, in some examples, the first view of the product comprises the first annotation and the second view of the product comprises the first annotation. In some examples, the first view of the product can comprise the first annotation and the second view of the product comprises a second annotation. In some examples, the first view of the product can comprise a first animation and the second view of the product comprises the first animation. In some examples, the first view of the product comprises a first animation and the second view of the product comprises a second animation.

Additionally or alternatively, in some examples, determining the identity of the product comprises determining the identity based on a user account shared by the product and the second computing device and/or a catalog of products.

Additionally or alternatively, in some examples, the first input comprises a gesture input at respective location corresponding to the virtual representation of the product, and the first annotation corresponds to the gesture input and the respective location corresponding to a first view of the product presented at the second computing device.

Some examples of the disclosure can be directed to an electronic device comprising one or more processors; memory; and one or more programs. The one or more programs can be stored in the memory and can be configured to be executed by the one or more processors. The one or more programs can include instructions for performing any of the aforementioned processes. Some examples of the disclosure can be directed to a non-transitory computer readable storage medium storing one or more programs. The one or more programs can comprise instructions, which when executed by one or more processors of an electronic device, can cause the electronic device to perform any of the aforementioned processes.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method, comprising:
at a first computing device, configured to receive one or more inputs from a first user, in communication with one or more input devices and a second computing device, configured to receive one or more inputs from a second user:
capturing, using the one or more input devices, one or more images;
determining an identity of a physical object in a physical environment of the first computing device using the one or more images;
transmitting the identity of the physical object to the second computing device;
determining a first state of the physical object using the one or more images;
transmitting the first state of the physical object to the second computing device;
after determining and transmitting the identity of the physical object to the second computing device, receiving from the second computing device an indication of a first input received at the second computing device, wherein the first input corresponds to the physical object, the identity of which was determined and transmitted to the second computing device; and
presenting a first view of the physical object comprising a first annotation that corresponds to the first input received at the second computing device, wherein the first annotation corresponds to an instruction to perform one or more actions corresponding to the physical object, and wherein presenting the first view of the physical object includes a representation of the physical object in the first state.

2. The method of claim 1, further comprising:
while presenting the first view of the physical object comprising the first annotation, detecting, using the one or more input devices, a modification of the physical object corresponding to the first annotation;
determining a second state of the physical object; and
transmitting the second state of the physical object to the second computing device.

3. The method of claim 1, further comprising:
presenting a virtual representation of the physical object concurrently with the first view of the physical object.

4. The method of claim 3, wherein presenting the first view of the physical object comprising the first annotation comprises presenting the first annotation on the physical object, the method further comprising:
presenting the first annotation on the virtual representation of the physical object; or
presenting a second annotation, different from the first annotation, on the virtual representation of the physical object.

5. The method of claim 3, wherein presenting the first view of the physical object comprising the first annotation comprises presenting a first animation in correspondence with the physical object, the method further comprising:
presenting the first animation in correspondence with the virtual representation of the physical object; or
presenting a second animation, different from the first animation, in correspondence with the virtual representation of the physical object.

6. The method of claim 1, wherein determining the identity of the physical object comprises determining the identity based on one or more of:
a user account shared by the physical object and the first computing device; or
a catalog of physical objects.

7. The method of claim 1, wherein the first input comprises a gesture input at a respective location corresponding to a virtual representation of the physical object at the second computing device, and the first annotation corresponds to the gesture input and the respective location corresponding to the first view of the physical object.

8. The method of claim 1, wherein the identity of the physical object is transmitted to the second computing device without transmitting the one or more images.

9. A first computing device, comprising:
one or more processors;
memory; and
one or more programs, wherein the one or more programs are stored in the memory and configured to be executed by the one or more processors, the one or more programs including instructions for:
capturing, using one or more input devices, one or more images;
determining an identity of a physical object in a physical environment of the first computing device using the one or more images;
transmitting the identity of the physical object to a second computing device;
determining a first state of the physical object using the one or more images;
transmitting the first state of the physical object to the second computing device;
after determining and transmitting the identity of the physical object to the second computing device, receiving from the second computing device an indication of a first input received at the second computing device, wherein the first input corresponds to the physical object, the identity of which was determined and transmitted to the second computing device; and presenting a first view of the physical object comprising a first annotation that corresponds to the first input received at the second computing device, wherein the first annotation corresponds to an instruction to perform one or more actions corresponding to the physical object, and wherein presenting the first view of the physical object includes a representation of the physical object in the first state.

10. The first computing device of claim 9, the one or more programs including instructions for:

while presenting the first view of the physical object comprising the first annotation, detecting, using the one or more input devices, a modification of the physical object corresponding to the first annotation;
determining a second state of the physical object; and
transmitting the second state of the physical object to the second computing device.

11. The first computing device of claim 9, the one or more programs including instructions for:

presenting a virtual representation of the physical object concurrently with the first view of the physical object.

12. The first computing device of claim 11, wherein presenting the first view of the physical object comprising the first annotation comprises presenting the first annotation on the physical object, the one or more programs including instructions for:

presenting the first annotation on the virtual representation of the physical object; or
presenting a second annotation, different from the first annotation, on the virtual representation of the physical object.

13. The first computing device of claim 11, wherein presenting the first view of the physical object comprising the first annotation comprises presenting a first animation in correspondence with the physical object, the one or more programs including instructions for:

presenting the first animation in correspondence with the virtual representation of the physical object; or
presenting a second animation, different from the first animation, in correspondence with the virtual representation of the physical object.

14. The first computing device of claim 9, wherein determining the identity of the physical object comprises determining the identity based on one or more of:

a user account shared by the physical object and the first computing device; or a catalog of physical objects.

15. The first computing device of claim 9, wherein the first input comprises a gesture input at a respective location corresponding to a virtual representation of the physical object at the second computing device, and the first annotation corresponds to the gesture input and the respective location corresponding to the first view of the physical object.

16. The first computing device of claim 9, wherein the identity of the physical object is transmitted to the second computing device without transmitting the one or more images.

17. A non-transitory computer readable storage medium storing one or more programs, the one or more programs comprising instructions, which when executed by one or more processors of a first computing device, cause the first computing device to:

capture, using one or more input devices, one or more images;
determine an identity of a physical object in a physical environment of a first computing device using the one or more images;
transmit the identity of the physical object to a second computing device;
determine a first state of the physical object using the one or more images;
transmit the first state of the physical object to the second computing device;
after determining and transmitting the identity of the physical object to the second computing device, receive from the second computing device an indication of a first input received at the second computing device, wherein the first input corresponds to the physical object, the identity of which was determined and transmitted to the second computing device; and
present a first view of the physical object comprising a first annotation that corresponds to the first input received at the second computing device, wherein the first annotation corresponds to an instruction to perform one or more actions corresponding to the physical object, and wherein presenting the first view of the physical object includes a representation of the physical object in the first state.

18. The non-transitory computer readable storage medium of claim 17, the one or more programs comprising instructions, which when executed by one or more processors of a first computing device, cause the first computing device to:

while presenting the first view of the physical object comprising the first annotation, detect, using the one or more input devices, a modification of the physical object corresponding to the first annotation;
determine a second state of the physical object; and
transmit the second state of the physical object to the second computing device.

19. The non-transitory computer readable storage medium of claim 17, the one or more programs further comprising instructions which cause the first computing device to:

present a virtual representation of the physical object concurrently with the first view of the physical object.

20. The non-transitory computer readable storage medium of claim 19, wherein presenting the first view of the physical object comprising the first annotation comprises presenting the first annotation on the physical object, the one or more programs further comprising instructions which cause the first computing device to:

present the first annotation on the virtual representation of the physical object; or
present a second annotation, different from the first annotation, on the virtual representation of the physical object.

21. The non-transitory computer readable storage medium of claim 19, wherein presenting the first view of the physical object comprising the first annotation comprises presenting a first animation in correspondence with the physical object, the one or more programs further comprising instructions which cause the first computing device to:

present the first animation in correspondence with the virtual representation of the physical object; or
present a second animation, different from the first animation, in correspondence with the virtual representation of the physical object.

22. The non-transitory computer readable storage medium of claim 17, wherein determining the identity of the physical object comprises determining the identity based on one or more of:
   a user account shared by the physical object and the first computing device; or
   a catalog of physical objects.

23. The non-transitory computer readable storage medium of claim 17, wherein the first input comprises a gesture input at a respective location corresponding to a virtual representation of the physical object at the second computing device, and the first annotation corresponds to the gesture input and the respective location corresponding to the first view of the physical object.

24. The non-transitory computer readable storage medium of claim 17, wherein the identity of the physical object is transmitted to the second computing device without transmitting the one or more images.

\* \* \* \* \*